United States Patent
Ikeda et al.

(10) Patent No.: US 12,244,835 B2
(45) Date of Patent: Mar. 4, 2025

(54) IMAGE PROCESSING DEVICE AND IMAGE PROCESSING METHOD

(71) Applicant: Sony Group Corporation, Tokyo (JP)

(72) Inventors: Masaru Ikeda, Tokyo (JP); Jongdae Kim, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 173 days.

(21) Appl. No.: 17/635,384

(22) PCT Filed: Sep. 18, 2020

(86) PCT No.: PCT/JP2020/035428
§ 371 (c)(1),
(2) Date: Feb. 15, 2022

(87) PCT Pub. No.: WO2021/054438
PCT Pub. Date: Mar. 25, 2021

(65) Prior Publication Data
US 2022/0345733 A1    Oct. 27, 2022

Related U.S. Application Data

(60) Provisional application No. 62/903,210, filed on Sep. 20, 2019.

(51) Int. Cl.
*H04N 19/33* (2014.01)
*H04N 19/174* (2014.01)
*H04N 19/426* (2014.01)

(52) U.S. Cl.
CPC ........... *H04N 19/33* (2014.11); *H04N 19/174* (2014.11); *H04N 19/426* (2014.11)

(58) Field of Classification Search
None
See application file for complete search history.

(56) References Cited

U.S. PATENT DOCUMENTS

| | | | |
|---|---|---|---|
| 2013/0308709 A1 | 11/2013 | Norkin et al. | |
| 2014/0086330 A1 | 3/2014 | Zhou | |
| 2014/0192895 A1* | 7/2014 | Chen | H04N 19/423 375/240.25 |

(Continued)

OTHER PUBLICATIONS

International Search Report and Written Opinion mailed on Dec. 8, 2020, received for PCT Application PCT/JP2020/035428, Filed on Sep. 18, 2020, 11 pages including English Translation.

(Continued)

*Primary Examiner* — Mikhail Itskovich
(74) *Attorney, Agent, or Firm* — XSENSUS LLP

(57) ABSTRACT

The present disclosure relates to an image processing device and an image processing method that enable image processing to be performed with a smaller number of line buffers. The image processing device includes a decoding unit that decodes a bitstream to generate an image according to an encoding standard in which a horizontal size of one tile is restricted for each level by a restriction value. The restriction value is set according to a maximum value MaxLumaPs of the number of luminance picture samples, and also restricts a vertical size of one tile. The present technology can be applied to, for example, an image processing system that performs encoding and decoding according to the VVC method.

5 Claims, 14 Drawing Sheets

(56) References Cited

U.S. PATENT DOCUMENTS

2015/0264373 A1* 9/2015 Wang ............... H04N 19/44
375/240.25
2016/0366440 A1 12/2016 Hattori

OTHER PUBLICATIONS

Fuldseth, "AHG4/AHG9: On tile size restrictions in HEVC", Joint Collaborative Team on Video Coding (JCT-VC) of ITU-T SG 16 WP 3 and ISO/IEC JTC 1/SC 29/WG 11, JCTVC-J0235, Jul. 11-20, 2012, 8 pages.

Nokin et al., "Level Restrictions on Tiles for Line Buffer Reduction", Joint Collaborative Team on Video Coding (JCT-VC) of ITU-T SG16 WP3 and ISO/IEC JTC1/SC29/WG11, JCTVC-10255, Apr. 27-May 7, 2012, 7 pages.

Ikeda et al., "Level Restrictions on Maximum Tile Width for Line Buffer Reduction", Joint Video Experts Team (JVET) of ITU-T SG 16 WP 3 and ISO/IEC JTC 1/SC 29/WG 11, JVET-P0295-v2, Oct. 1-11, 2019, 4 pages.

* cited by examiner

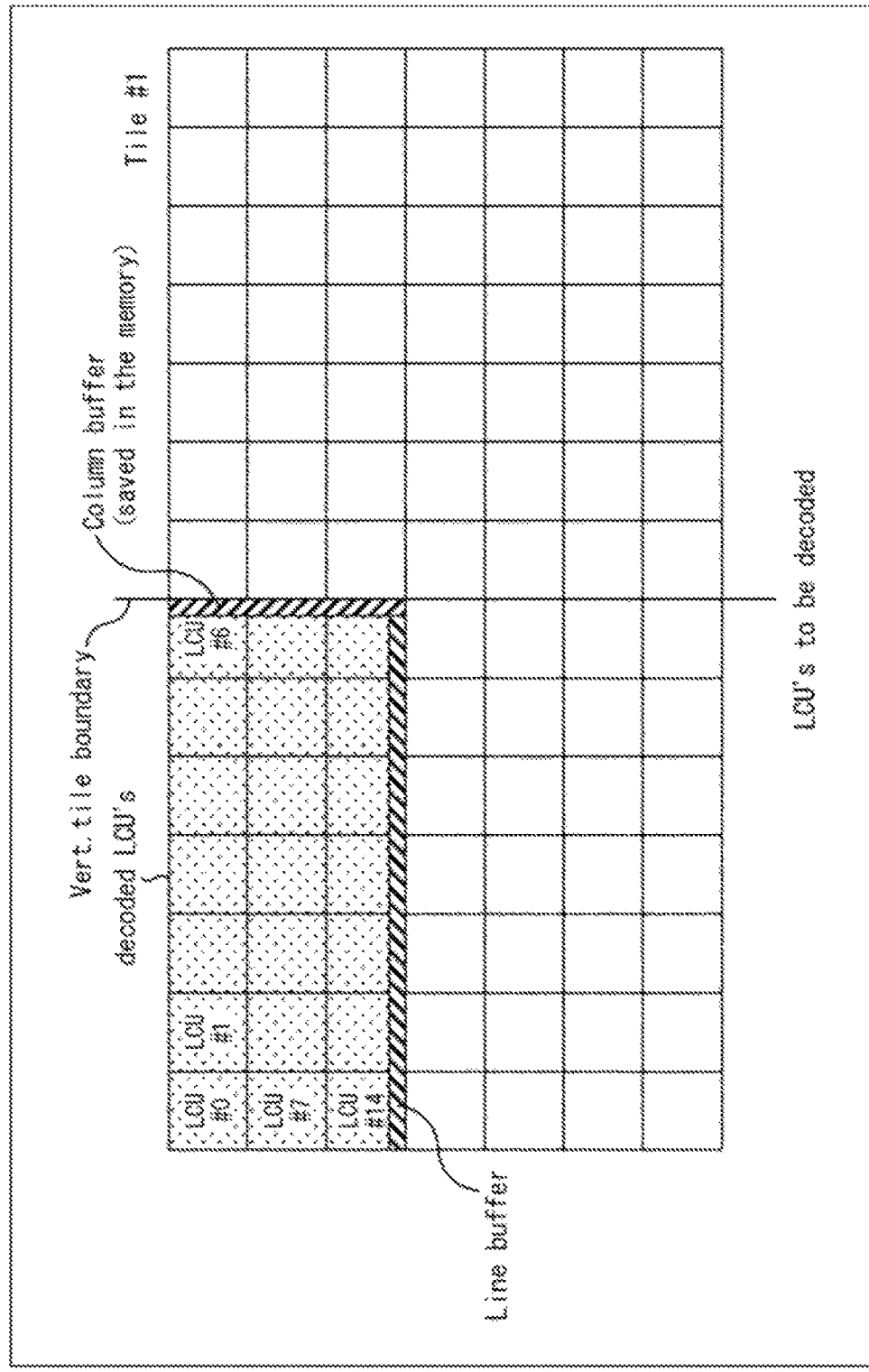

Fig. 2    Background Art

A — Table 1 Example on restrictions on Tile size

| Level | MaxTileWidthInLCU | MinTileWidthInLCU | MinTileHeightInLCU |
|---|---|---|---|
| 5 and above | 30 | 3 | 3 |

B — Table 2 Example on restrictions on Tile size

| Level | MaxTileWidthInPixels | MinTileWidthInPixels | MinTileHeightInPixels |
|---|---|---|---|
| 5 | 1920 | 192 | 192 |

Another example on possible restrictions on tile size would be as shown in Table 3.

C — Table 3 Another example of restrictions on Tile size

| Level | MaxTileWidthInLCU | MinTileBorderInLCU |
|---|---|---|
| 5 and above | 30 | 6 | where MinTileBorderInLCU is equal to MinTileHeightInLCU+MinTileWidthInLCU.

D — Table 4 Another example of restrictions on Tile size

| Level | MaxTileWidthInPixels | MinTileBorderInpixels |
|---|---|---|
| 5 and above | 1920 | 384 | where MinTileBorderInLCU is equal to MinTileHeightInLCU+MinTileWidthInLCU.

Fig. 3    Background Art

| Max_pic_width_vps_in_luma_samples for each level | | | | | | | | | |
|---|---|---|---|---|---|---|---|---|---|
| Max pic width vps in luma samples =Sqrt(MaxLumaPs*8) | | 4 222 | 4 222 | 8 444 | 8 444 | 8 444 | 8 444 | 8 444 | 8 444 |
| Max # of tile columns MaxTileCols | | 5 | 5 | 10 | 10 | 10 | 20 | 20 | 20 |
| Max # of tile rows MaxTileRows | | 5 | 5 | 11 | 11 | 11 | 22 | 22 | 22 |
| Max slice segments per picture MaxSliceSegmentsPerPicture | | 75 | 75 | 200 | 200 | 200 | 600 | 600 | 600 |
| Max CPB size MaxCPB (CpbVclFactor or CpbNalFactor bits) | High tier | 30 000 | 50 000 | 100 000 | 160 000 | 240 000 | 240 000 | 480 000 | 800 000 |
| | Main tier | 12 000 | 20 000 | 25 000 | 40 000 | 60 000 | 60 000 | 120 000 | 240 000 |
| Max luma picture size MaxLumaPs (samples) | | 2 228 224 | 2 228 224 | 8 912 896 | 8 912 896 | 8 912 896 | 35 651 584 | 35 651 584 | 35 651 584 |
| Level | | 4 | 4.1 | 5 | 5.1 | 5.2 | 6 | 6.1 | 6.2 |

Fig. 4    Background Art

Picture size when maximum size is set

| Level | Max luma picture size MaxLumaPs | Max pic width vps in luma samples =Sqrt(MaxLumaPs * 8) | Picture size |
|---|---|---|---|
| 4 | 2,228,224 | 4,222 | 4,222 x 527 |
| 4.1 | 2,228,224 | 4,222 | 4,222 x 527 |
| 5 | 8,912,896 | 8,444 | 8,444 x 1,055 |
| 5.1 | 8,912,896 | 8,444 | 8,444 x 1,055 |
| 5.2 | 8,912,896 | 8,444 | 8,444 x 1,055 |
| 6 | 35,651,584 | 16,888 | 16,888 x 2,111 |
| 6.1 | 35,651,584 | 16,888 | 16,888 x 2,111 |
| 6.2 | 35,651,584 | 16,888 | 16,888 x 2,111 |

Fig. 6

| Restriction values for each level according to Max luma picture size (MaxLumaPs) | | | | | | | | | |
|---|---|---|---|---|---|---|---|---|---|
| Tile size in case of max tile width in luma samples | | 2 111 × 1 055 | 2 111 × 1 055 | 4 222 × 2 111 | 4 222 × 2 111 | 4 222 × 2 111 | 8 444 × 4 222 | 8 444 × 4 222 | 8 444 × 4 222 |
| Max tile height in luma samples =Sqrt(MaxLumaPs*2) | | 2 111 | 2 111 | 4 222 | 4 222 | 4 222 | 8 444 | 8 444 | 8 444 |
| Max tile width in luma samples =Sqrt(MaxLumaPs*2) | | 2 111 | 2 111 | 4 222 | 4 222 | 4 222 | 8 444 | 8 444 | 8 444 |
| Max pic width vps in luma samples =Sqrt(MaxLumaPs*8) | | 4 222 | 4 222 | 8 444 | 8 444 | 8 444 | 16 888 | 16 888 | 16 888 |
| Max # of tile columns MaxTileCols | | 5 | 5 | 10 | 10 | 10 | 20 | 20 | 20 |
| Max # of tile rows MaxTileRows | | 5 | 5 | 11 | 11 | 11 | 22 | 22 | 22 |
| Max slice segments per picture MaxSliceSegmentsPerPicture | | 75 | 75 | 200 | 200 | 200 | 600 | 600 | 600 |
| Max CPB size MaxCPB (CpbVclFactor or CpbNalFactor bits) | High tier | 30 000 | 50 000 | 100 000 | 160 000 | 240 000 | 240 000 | 480 000 | 800 000 |
| | Main tier | 12 000 | 20 000 | 25 000 | 40 000 | 60 000 | 60 000 | 120 000 | 240 000 |
| Max luma picture size MaxLumaPs (samples) | | 2 228 224 | 2 228 224 | 8 912 896 | 8 912 896 | 8 912 896 | 35 651 584 | 35 651 584 | 35 651 584 |
| Level | | 4 | 4.1 | 5 | 5.1 | 5.2 | 6 | 6.1 | 6.2 |

Fig. 7

Restriction values for each level according to Max luma picture size (MaxLumaPs) applied to each tier

| | | Level 4 | Level 4.1 | Level 5 | Level 5.1 | Level 5.2 | Level 6 | Level 6.1 | Level 6.2 |
|---|---|---|---|---|---|---|---|---|---|
| Max tile height in luma samples =Sqrt(MaxLumaPs*2) | High tier | 4 222 | 4 222 | 8 444 | 8 444 | 8 444 | 16 888 | 16 888 | 16 888 |
| | Main tier | 2 111 | 2 111 | 4 222 | 4 222 | 4 222 | 8 444 | 8 444 | 8 444 |
| Max tile width in luma samples =Sqrt(MaxLumaPs*2) | High tier | 4 222 | 4 222 | 8 444 | 8 444 | 8 444 | 16 888 | 16 888 | 16 888 |
| | Main tier | 2 111 | 2 111 | 4 222 | 4 222 | 4 222 | 8 444 | 8 444 | 8 444 |
| Max pic width vps in luma samples =Sqrt(MaxLumaPs*8) | | 4 222 | 4 222 | 8 444 | 8 444 | 8 444 | 16 888 | 16 888 | 16 888 |
| Max # of tile columns MaxTileCols | | 5 | 5 | 10 | 10 | 10 | 20 | 20 | 20 |
| Max # of tile rows MaxTileRows | | 5 | 5 | 11 | 11 | 11 | 22 | 22 | 22 |
| Max slice segments per picture MaxSliceSegmentsPerPicture | | 75 | 75 | 200 | 200 | 200 | 600 | 600 | 600 |
| Max CPB size MaxCPB (CpbVclFactor or CpbNalFactor bits) | High tier | 30 000 | 50 000 | 100 000 | 160 000 | 240 000 | 240 000 | 480 000 | 800 000 |
| | Main tier | 12 000 | 20 000 | 25 000 | 40 000 | 60 000 | 60 000 | 120 000 | 240 000 |
| Max luma picture size MaxLumaPs (samples) | | 2 228 224 | 2 228 224 | 8 912 896 | 8 912 896 | 8 912 896 | 35 651 584 | 35 651 584 | 35 651 584 |
| Level | | 4 | 4.1 | 5 | 5.1 | 5.2 | 6 | 6.1 | 6.2 |

IMAGE PROCESSING DEVICE AND IMAGE PROCESSING METHOD

CROSS-REFERENCE TO RELATED APPLICATIONS

The present application is based on PCT filing PCT/JP2020/035428, filed Sep. 18, 2020, which claims priority to U.S. Provisional Application No. 62/903,210, filed Sep. 20, 2019, the entire contents of each are incorporated herein by reference.

TECHNICAL FIELD

The present disclosure relates to an image processing device and an image processing method, and more particularly to an image processing device and an image processing method that enable image processing to be performed with a smaller number of line buffers.

BACKGROUND ART

In recent years, in order to further improve the encoding efficiency for AVC (Advanced Video Coding) and HEVC (High Efficiency Video Coding), the standardization of a coding method called VVC (Versatile Video Coding) is being progressed (see also supports of the embodiment described later).

For example, as disclosed in NPL 1, in VVC, the size of one tile is restricted, and the restriction value is a fixed value.

CITATION LIST

Non Patent Literature

[NPL 1]
JCTVC-I0255

SUMMARY

Technical Problem

By the way, when image processing for encoding and decoding an image is performed based on NPL 1, it is necessary for the decoding side to include a line buffer having a large size in order to support this size.

The present disclosure has been made in view of such a situation, and is intended to enable image processing to be performed with a smaller number of line buffers.

Solution to Problem

An image processing device according to a first aspect of the present disclosure includes a decoding unit that decodes a bitstream to generate an image according to an encoding standard in which a horizontal size of one tile is restricted for each level by a restriction value.

An image processing method according to a first aspect of the present disclosure includes allowing an image processing device to decode a bitstream to generate an image according to an encoding standard in which a horizontal size of one tile is restricted for each level by a restriction value.

In the first aspect of the present disclosure, a bitstream is decoded to generate an image according to an encoding standard in which a horizontal size of one tile is restricted for each level by a restriction value.

An image processing device according to a second aspect of the present disclosure includes an encoding unit that encodes an image to generate a bitstream according to an encoding standard in which a horizontal size of one tile is restricted for each level by a restriction value.

An image processing method according to a second aspect of the present disclosure includes allowing an image processing device to encode an image to generate a bitstream according to an encoding standard in which a horizontal size of one tile is restricted for each level by a restriction value.

In the second aspect of the present disclosure, an image is encoded to generate a bitstream according to an encoding standard in which a horizontal size of one tile is restricted for each level by a restriction value.

BRIEF DESCRIPTION OF DRAWINGS

FIG. 1 is a diagram illustrating decoding in units of LCUs.

FIG. 2 is a diagram showing conventional restriction values.

FIG. 3 is a diagram showing Max_pic_width_vps_in_luma_samples for each level.

FIG. 4 is a diagram showing a picture size when the maximum size is set.

FIG. 6 is a diagram showing restriction values for each level according to Max luma picture size (MaxLumaPs).

FIG. 7 is a diagram showing restriction values for each level according to Max luma picture size (MaxLumaPs) applied to each tier.

DESCRIPTION OF EMBODIMENTS

Figure 5:
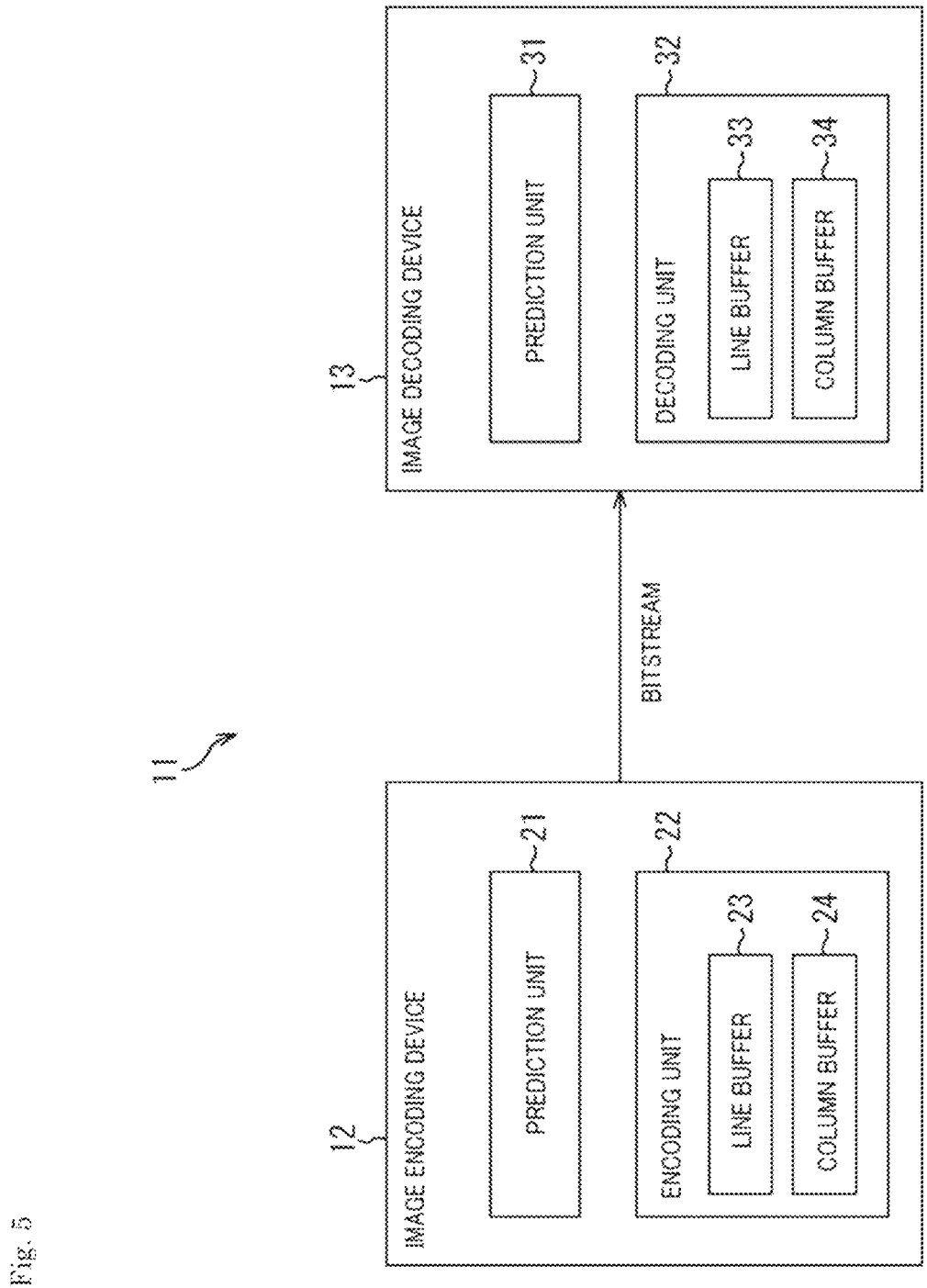
FIG. 5 is a block diagram showing a configuration example of an embodiment of an image processing system to which the present technology is applied.

<Documents that Support Technical Content and Terms>

The scope disclosed in the present description is not limited to the content of the embodiments. The disclosures in the following reference documents REF1 to REF4, which have been publicly known at the time of filing of the present application, are also incorporated into the present description by reference. In other words, the disclosures in the following reference documents REF1 to REF4 also serve as the grounds for determination on the support requirements. In addition, the references referenced in the reference documents REF1 to REF4 also serve as the grounds for determination on the support requirements.

For example, even if Quad-Tre Block Structure, QTBT (Quad Tree Plus Binary Tree) Block Structure, and MTT (Multi-type Tree) Block Structure are not directly defined in the detailed description of the invention, the structures are considered to be included within the scope of the present disclosure and to satisfy the support requirements of the claims. For example, the same applies to the technical terms such as Parsing, Syntax, and Semantics. Even if these technical terms are not directly defined in the detailed description of the invention, the technical terms are considered to be included within the scope of the present disclosure and to satisfy the support requirements of the claims.

REF1: Recommendation ITU-T H.264 (April 2017) "Advanced video coding for generic audiovisual services", April 2017

REF2: Recommendation ITU-T H.265 (February 2018) "High efficiency video coding", February 2018

REF3: Benjamin Bross, Jianle Chen, Shan Liu, Versatile Video Coding (Draft 6), JVET-O2001-v14 (version 14, date 2019-07-31)

REF4: Jianle Chen, Yan Ye, Seung Hwan Kim, Algorithm description for Versatile Video Coding and Test Model 6 (VTM 6), JVET-O2002-v1 (version 1, date 2019-08-15)

<Terminology>

In this application, the following terms are defined as follows.

<Block>

A "block" (not a block indicating a processing unit) used for description as a partial area or a unit of processing of an image (picture) indicates an arbitrary partial area in a picture unless otherwise specified, and the size, shape, characteristics, and the like of the block are not limited. For example, the "block" includes an arbitrary partial area (unit of processing) such as TB (Transform Block), TU (Transform Unit), PB (Prediction Block), PU (Prediction Unit), SCU (Smallest Coding Unit), CU (Coding Unit), and LCU (Largest Coding Unit), CTB (Coding Tree Block), CTU (Coding Tree Unit), conversion block, subblock, macroblock, tile, slice, and the like.

<Specifying Block Size>

Furthermore, in specifying the size of such a block, not only the block size is directly specified but also the block size may be indirectly specified. For example, the block size may be specified using identification information for identifying the size. Furthermore, for example, the block size may be specified by a ratio or a difference from the size of a reference block (for example, an LCU, an SCU, or the like). For example, in a case of transmitting information for specifying the block size as a syntax element or the like, information for indirectly specifying the size as described above may be used as the information. By doing so, the amount of information can be reduced, and the encoding efficiency can be improved in some cases. Furthermore, the specification of the block size also includes specification of a range of the block size (for example, specification of a range of allowable block sizes, or the like).

<Unit of Information and Processing>

The data unit in which various types of information described above are set and the data unit to be processed by various types of processing are arbitrary and are not limited to the above-described examples. For example, these pieces of information and processing may be set for each TU (Transform Unit), TB (Transform Block), PU (Prediction Unit), PB (Prediction Block), CU (Coding Unit), LCU (Largest Coding Unit), subblock, block, tile, slice, picture, sequence, or component, or data in these data units may be used. Of course, this data unit can be set for each information and processing, and the data units of all pieces of information and processing need not to be unified. Note that the storage location of these pieces of information is arbitrary, and may be stored in a header, a parameter set, or the like of the above-described data unit. Furthermore, the information may be stored in a plurality of locations.

<Control Information>

Control information regarding the present technology may be transmitted from the encoding side to the decoding side. For example, control information (e.g., enabled_flag) for controlling whether to permit (or prohibit) application of the above-described present technology may be transmitted. Furthermore, for example, control information indicating an object to which the above-described present technology is applied (or an object to which the present technology is not applied) may be transmitted. For example, control information for specifying a block size (upper limit, lower limit, or both) to which the present technology is applied (or application is permitted or prohibited), a frame, a component, a layer, or the like may be transmitted.

<Flag>

In the present description, the "flag" is information for identifying a plurality of states and includes not only information used to identify two states of true (1) and false (0) but also information for identifying three or more states. Accordingly, a value of the "flag" may be a binary value of I/O or may be, for example, a ternary value or the like. That is, any number of bits in the "flag" can be used and may be 1 bit or a plurality of bits. For identification information (also including the flag), it is assumed that the identification information is included in a bitstream and difference information of the identification information with respect to information serving as a certain standard is included in a bitstream. Therefore, in the present description, the "flag" or the "identification information" includes not only the information but also difference information with respect to information serving as a standard.

<Association with Metadata>

Furthermore, various types of information (metadata and the like) about encoded data (bitstreams) may be transmitted or recorded in any form as long as they are associated with the encoded data. Here, the term "associate" means, for example, making other information available (linkable) when one piece of information is processed. That is, associated information may be collected as one piece of data or may be individual information. For example, information associated with encoded data (image) may be transmitted on a transmission path different from that for the encoded data (image). Further, for example, information associated with encoded data (image) may be recorded on a recording medium (or another recording area of the same recording medium) different from that for the encoded data (image). Meanwhile, this "association" may be for part of data, not the entire data. For example, an image and information corresponding to the image may be associated with a plurality of frames, one frame, or any unit such as a part in the frame.

In the present description, a term such as "combining", "multiplexing", "adding", "integrating", "including", "storing", "pushing", "entering", or "inserting" means that a plurality of things is collected as one, for example, encoded data and metadata are collected as one piece of data and means one method of the above-described "associating". Further, in the present description, encoding includes not only the entire process of converting an image into a bitstream but also a part of the process. For example, encoding includes not only processing that includes prediction processing, orthogonal transform, quantization, and arithmetic encoding, but also includes processing that collectively refers to quantization and arithmetic encoding, and processing that includes prediction processing, quantization, and arithmetic encoding. Similarly, decoding includes not only the entire process of converting a bitstream into an image but also a part of the process. For example, not only includes processing that includes inverse arithmetic decoding, inverse quantization, inverse orthogonal transform, prediction processing, but also processing that includes inverse arithmetic decoding and inverse quantization, inverse arithmetic decoding, inverse quantization, and prediction processing. Including comprehensive processing.

An image means the original image before encoding. A decoded image means an image output after the decoding process is performed. The locally decoded image is an image output after being locally decoded when the image is encoded. An encoded data means the data after an image (texture) is encoded. A bitstream (or encoded bitstream, or encoded stream) means data including encoded data as well as data in which parameters required for encoding or decoding are encoded. A parameter (encoded parameter) is a general term for data required for encoding or decoding, and is typically the syntax, a parameter set, or the like of the bitstream. The parameter (encoded parameter) includes variables and the like used in the derivation process.

In the present disclosure, identification data that identifies a plurality of patterns can be set as the syntax of a bitstream. In this case, the decoder can perform processing more efficiently by parsing and referencing the identification data.

Hereinafter, specific embodiments to which the present technology is applied will be described in detail with reference to the drawings.

<Conventional Restriction Values>

Conventional restriction values will be described with reference to FIGS. 1 to 4.

As shown in FIG. 1, in VVC, when decoding one tile, decoding is performed in units of LCU (Largest Coding Unit), which is the maximum CU (Coding Unit). For example, when LCUs that are 7×3 horizontally and vertically, respectively are subject to decoding, a line buffer with a size corresponding to seven LCUs is required, and a column buffer with a size corresponding to three LCUs is required.

In NPL 1 described above, it is proposed to set a restriction value that restricts the size of one tile to a fixed value. For example, at level 5 and above, 1920 is fixedly provided as a restriction value, and at level 4 and below, no restriction value is provided.

FIG. 2 shows the restriction values proposed in NPL 1 described above.

"A" in FIG. 2 shows an example of a restriction value that restricts the size of one tile by the number of LCUs. At level 5 and above, the maximum tile width restriction value MaxTileWidthInLCU is fixedly set to thirty LCUs, the minimum tile width restriction value MinTileWidthInLCU is fixedly set to three LCUs, and the minimum tile height restriction value MinTileHeightInLCU is fixedly set to three LCUs.

"B" in FIG. 2 shows an example of a restriction value that restricts the size of one tile by the number of pixels. At level 5, the maximum tile width restriction value MaxTileWidthInPixels is fixedly set to 1920 pixels, the minimum tile width restriction value MinTileWidthInPixels is fixedly set to 192 pixels, and the minimum tile height restriction value MinTileHeightInPixels is fixedly set to 192 pixels.

"C" in FIG. 2 shows another example of a restriction value that restricts the size of one tile by the number of LCUs. At level 5 and above, the maximum tile width restriction value MaxTileWidthInLCU is fixedly set to thirty LCUs, and the minimum tile border (total of height and width) restriction value MinTileBorderInLCU is fixedly set to six LCUs.

"D" in FIG. 2 shows another example of the restriction value that restricts the size of one tile by the number of pixels. At level 5 and above, the maximum tile width restriction value MaxTileWidthInPixels is fixedly set to 1920 pixels, and the minimum tile border (total of height and width) restriction value MinTileBorderInpixels is fixedly set to 384 pixels.

In the HEVC standard, the restriction value Max_pic_width_vps_in_luma_samples that restricts the maximum picture width is set for each level based on the maximum value MaxLumaPs of the number of luminance picture samples.

FIG. 3 shows an example of the restriction value Max_pic_width_vps_in_luma_samples at level 4 and the like. As shown in the figure, the restriction value Max_pic_width_vps_in_luma_samples is set to Sprt (MaxLumaPs×8).

By the way, in order to support the size of an image having such a maximum picture width on the decoder side so that it can be decoded, it is necessary to have a configuration provided with a line buffer having a large size.

Here, when the picture width is set to the restriction value Max_pic_width_vps_in_luma_samples shown in FIG. 3, the picture size of each level becomes a horizontally long size as shown in FIG. 4. FIG. 4 shows an example of the picture size at level 4 and the like in that case. However, the horizontally long size as shown in FIG. 4 is a special case, and it is considered that the frequency of use thereof is low.

Therefore, in the present technology, it is proposed to appropriately set a restriction value that restricts the horizontal size of one tile according to the maximum value MaxLumaPs of the number of luminance picture samples, for example, for each level that defines the maximum resolution and frame rate. For example, a restriction value that restricts the horizontal size of one tile is set to cover a typical picture size at each level. Furthermore, it is proposed that the restriction is to be applied for each tier that defines the maximum bit rate at each level.

<Configuration Example of Image Processing System>

FIG. 5 is a block diagram showing a configuration example of an embodiment of an image processing system to which the present technology is applied.

As shown in FIG. 5, an image processing system 11 includes an image encoding device 12 and an image decoding device 13. For example, in the image processing system 11, the image input to the image encoding device 12 is encoded, the bitstream obtained by the encoding is transmitted to the image decoding device 13, and the decoded image decoded from the bitstream in the image decoding device 13 is output.

The image encoding device 12 has a prediction unit 21 and an encoding unit 22, and the image decoding device 13 has a prediction unit 31 and a decoding unit 32.

The prediction unit 21 generates a prediction image used for encoding an image input to the image encoding device 12 by inter-prediction or intra-prediction.

The encoding unit 22 encodes the image input to the image encoding device 12 according to the VVC method in which the horizontal size of one tile is restricted for each level by the restriction value to generate a bitstream. At this time, the encoding unit 22 temporarily holds the pixel values of the pixels in the row direction referred to in the encoding in a line buffer 23, and temporarily holds the pixel values of the pixels in the column direction referred to in the encoding in a column buffer 24.

The prediction unit 31 generates a prediction image used for decoding the bitstream input to the image decoding device 13 by inter-prediction or intra-prediction.

The decoding unit 32 decodes the bitstream input to the image decoding device 13 according to the VVC method in which the horizontal size of one tile is restricted for each level by the restriction value to generate an image. At this time, the encoding unit 22 temporarily holds the pixel values of the pixels in the row direction referred to in the decoding in a line buffer 33, and temporarily holds the pixel values of the pixels in the column direction referred to in the decoding in a column buffer 34.

In the image processing system 11 configured as described above, the encoding unit 22 and the decoding unit 32 perform encoding and decoding according to the VVC method in which the horizontal size of one tile is restricted for each level by the restriction value. This restriction value is set for each level according to the maximum value MaxLumaPs of the number of luminance picture samples.

Therefore, the image processing system 11 can perform encoding and decoding with the line buffers 23 and 33 with a smaller size as compared to the case without such restrictions.

<Restriction Values to which the Present Technology is Applied>

FIG. 6 shows an example of a restriction value that restricts the horizontal size and the vertical size of one tile for each level according to the maximum value MaxLumaPs (maximum size of the image) of the number of luminance picture samples.

For example, similarly to HEVC described with reference to FIG. 3 described above, in VVC, the restriction value Max_pic_width_vps_in_luma_samples is restricted for each level in consideration of the implementation of the decoder. In addition to this, the present technology provides restrictions on the horizontal size of one tile. Similarly, in the present technology, a restriction on the vertical size of one tile may be provided.

As shown in FIG. 6, the restriction value Max_tile_width_in_luma_samples that restricts the maximum horizontal size of one tile and the restriction value Max_tile_height_in_luma_samples that restricts the maximum vertical size of one tile are set according to the maximum value MaxLumaPs of the number of luminance picture samples for each level. Specifically, the restriction values are set as shown in the following equation (1).

[Math. 1]

$$\begin{cases} \text{Max\_tile\_width\_in\_luma\_samples} = \sqrt{MaxLumaPs \times 2} \\ \qquad = 0.5 \times \sqrt{MaxLumaPs \times 8} \\ \text{Max\_tile\_height\_in\_luma\_samples} = \sqrt{MaxLumaPs \times 2} \\ \qquad = 0.5 \times \sqrt{MaxLumaPs \times 8} \end{cases} \quad (1)$$

According to this equation (1), the restriction value Max_tile_width_in_luma_samples and the restriction value Max_tile_height_in_luma_samples are set to 2111 at level 4 (4, 4.1), 4222 at level 5 (5, 5.1, 5.2), and 8444 at level 6 (6, 6.1, 6.2).

Further, in the image processing system 11, such a restriction can be applied for each tier.

As shown in FIG. 7, the restriction value Max_tile_width_in_luma_samples that restricts the maximum horizontal size of one tile and the restriction value Max_tile_height_in_luma_samples that restricts the maximum vertical size of one tile are applied for each High tier and Main tier. Specifically, the restriction values are set as shown in the following equation (2).

[Math. 2]

$$\begin{cases} \text{Main tier:} \\ \bullet \text{ Max size of tile width} = \sqrt{MaxLumaPs \times 2} \\ \bullet \text{ Max size of tile height} = \sqrt{MaxLumaPs \times 2} \\ \text{Main tier:} \\ \bullet \text{ Max size of tile width} = \sqrt{MaxLumaPs \times 8} \\ \bullet \text{ Max size of tile height} = \sqrt{MaxLumaPs \times 8} \end{cases} \quad (2)$$

According to this equation (2), in the High tier, the restriction value Max_tile_width_in_luma_samples and the restriction value Max_tile_height_in_luma_samples are set to 4222 at level 4 (4, 4.1), 8444 at level 5 (5, 5.1, 5.2) and 16888 at level 6 (6, 6.1, 6.2). Similarly, in the Main tier, the restriction value Max_tile_width_in_luma_samples and the restriction value Max_tile_height_in_luma_samples are set to 2111 at level 4 (4, 4.1), 4222 at level 5 (5, 5.1, 5.2) and 8444 at level 6 (6, 6.1, 6.2).

As described above, in the image processing system 11, when encoding and decoding are performed, restrictions on the horizontal size and the vertical size of one tile are provided.

Even if such restrictions are provided, in the image processing system 11, the image decoding device 13 covers typical picture sizes at each level (for example, Level 4.x: 1920×1080, Level 5.x: 3840×2160, Level 6.x: 7680×4320). For example, if the image with the maximum value of the restriction value Max_pic_width_vps_in_luma_samples that restricts the maximum picture width is subject to image processing, it can be encoded and decoded using a plurality of tiles. In addition, compatibility with HEVC can be ensured.

Then, in the image processing system 11, the sizes of the line buffers 23 and 33 can be halved as compared to the prior art by providing the restriction value Max_tile_width_in_luma__samples that restricts the maximum horizontal size of one tile as described above. For example, under the conditions of Level 5 and YUV420, the size of the line buffer required by the prior art was 16,888×10 bit×1.5, whereas in the present technology, the size can be set to 8,444×10 bit×1.5.

Further, the sizes of the column buffers 24 and 34 when processing with tiles and filtering between tiles can be restricted by providing the restriction value Max_tile_height_in_luma_samples that restricts the maximum vertical size of one tile as described above.

The effect of adopting the present technology will be described with reference to FIG. 8.

Figure 8:
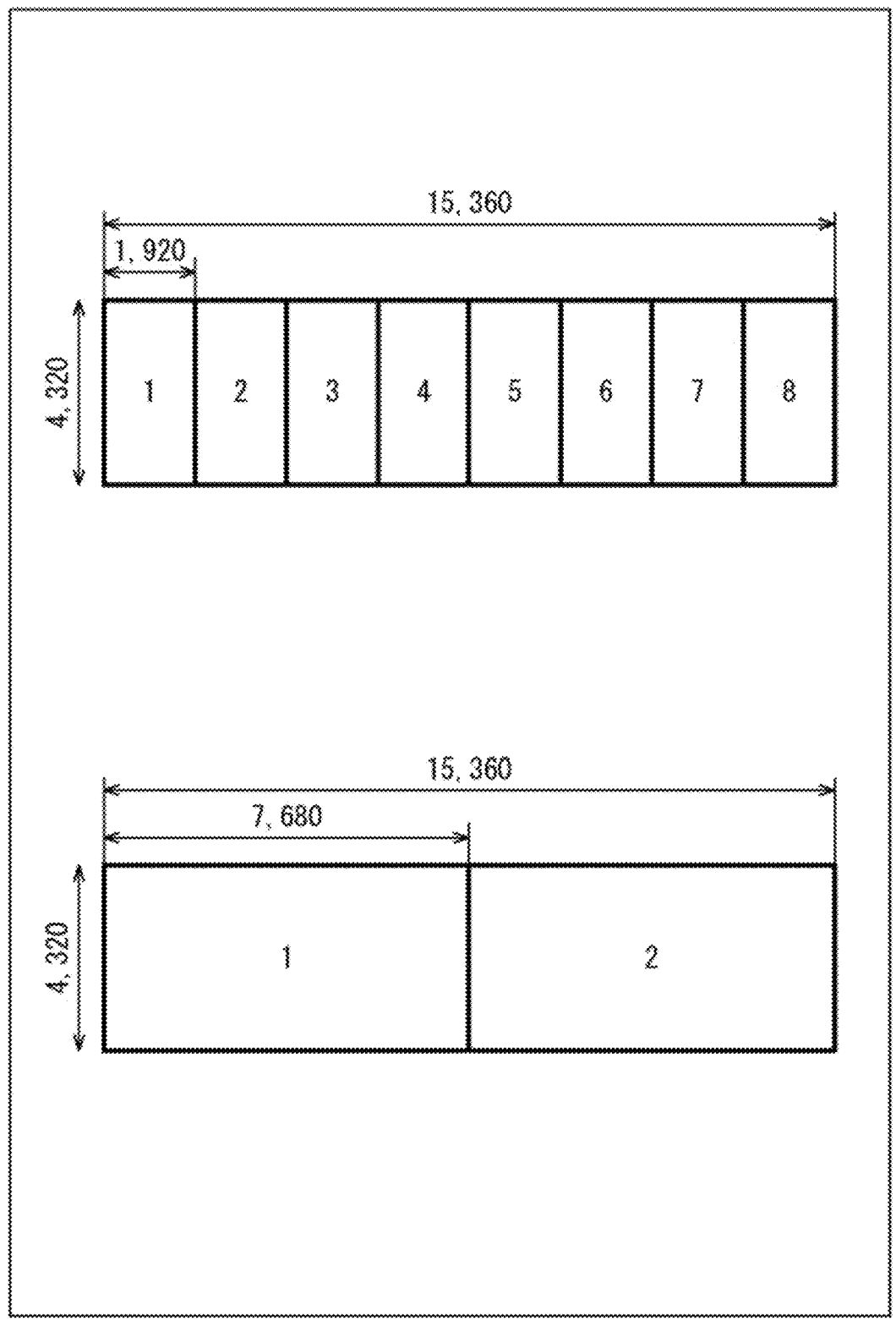
FIG. 8 is a diagram illustrating the effect of adopting the present technology.

In FIG. 8, for example, a case where an image having a picture size of 15,360×4,320 at level 6 is processed will be described. In this case, the maximum size of one tile is 1,920×4,320 under the restrictions of the prior art disclosed in NPL 1 described above. On the other hand, under the restrictions of the present technology the maximum size of one tile is 7,680×4,320.

As described above, the present technology is expected to have high encoding efficiency because it is possible to increase the size of one tile as compared with the prior art. On the other hand, the present technology prepares a line buffer having a larger size than the prior art, but restrictions are provided in consideration of the fact that the existing codec HEVC has already realized 4K size (3,840×2,160) with one tile.

In the present technology the maximum values of the horizontal size and vertical size of one tile are restricted for each level, but typical resolution sizes (for example, Level 4.x: 1,920×1,080, Level 5.x: 3,840×2,160, Level 6.x: 7,680× 4,320) are supported.

As described above, in the image processing system 11 to which the present technology is applied, encoding and decoding are performed according to the VVC method in which the horizontal size of one tile is restricted for each level by the restriction value, so that encoding and decoding can be performed with smaller numbers of line buffers and column buffers.

<Configuration Example of Computer-Based System>

Figure 9:
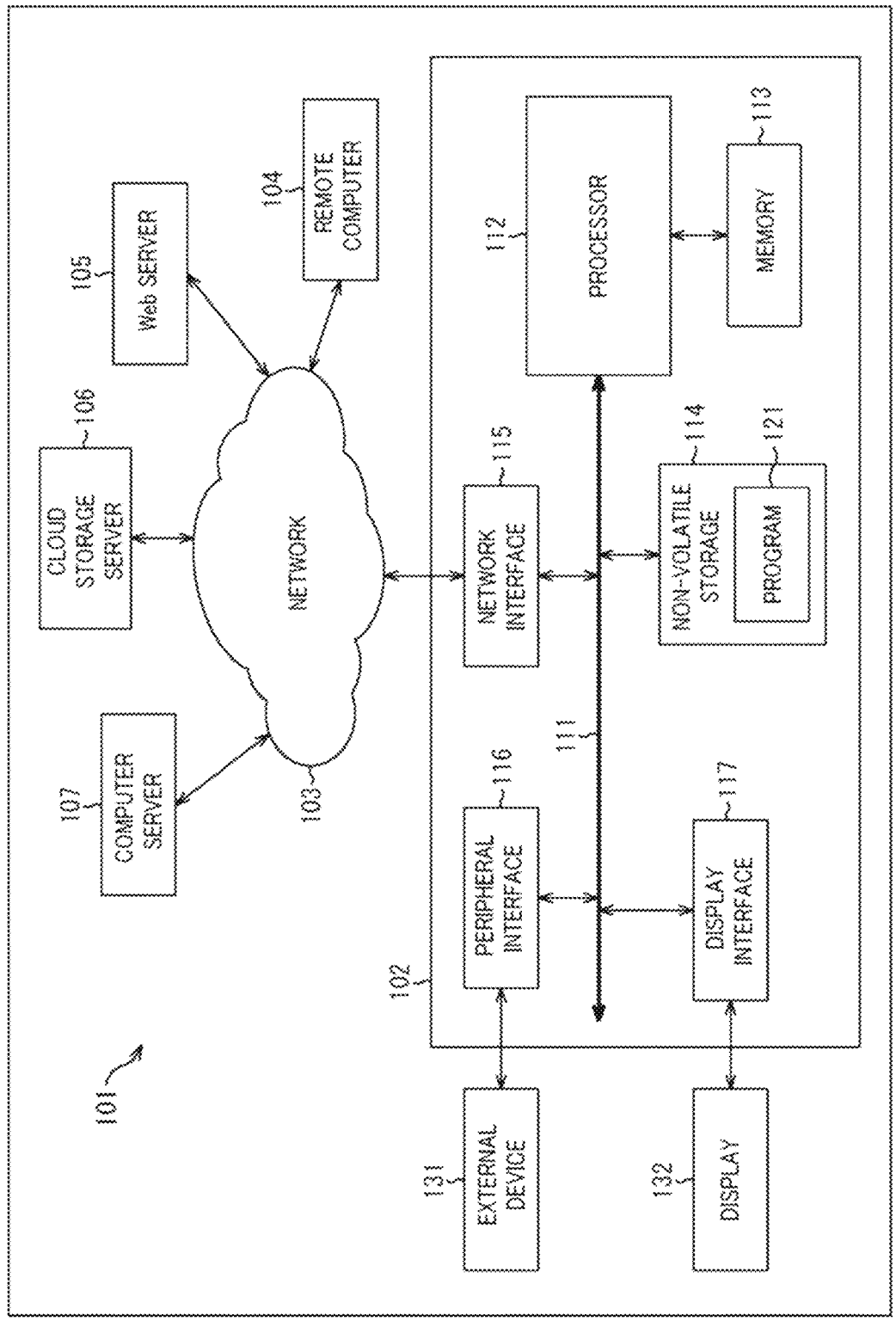
FIG. 9 is a block diagram showing a configuration example of an embodiment of a computer-based system to which the present technology is applied.

FIG. 9 is a block diagram showing a configuration example of an embodiment of a computer-based system to which the present technology is applied.

FIG. 9 is a block diagram showing a configuration example of a network system in which one or more computers, servers, and the like are connected via a network. The hardware and software environment shown in the embodiment of FIG. 9 is shown as an example capable of providing a platform for implementing the software and/or method according to the present disclosure.

As shown in FIG. 9, a network system 101 includes a computer 102, a network 103, a remote computer 104, a web server 105, a cloud storage server 106, and a computer server 107. Here, in the present embodiment, a plurality of instances are executed by one or a plurality of the functional blocks shown in FIG. 9.

Further, in FIG. 9, a detailed configuration of the computer 102 is illustrated. The functional block shown in the computer 102 is shown for establishing an exemplary function, and is not limited to such a configuration. Further, although the detailed configurations of the remote computer 104, the web server 105, the cloud storage server 106, and the computer server 107 are not shown, they include the same configurations as the functional blocks shown in the computer 102.

The computer 102 may be a personal computer, desktop computer, laptop computer, tablet computer, netbook computer, personal digital assistant, smartphone, or other programmable electronic device capable of communicating with other devices on the network.

The computer 102 includes a bus 111, a processor 112, a memory 113, a non-volatile storage 114, a network interface 115, a peripheral interface 116, and a display interface 117. Each of these functions is, in one embodiment, implemented in an individual electronic subsystem (integrated circuit chip or combination of chips and related devices), or in other embodiments, some of the functions may be combined and mounted on a single chip (SoC (System on Chip)).

The bus 111 can employ a variety of proprietary or industry standard high-speed parallel or serial peripheral interconnect buses.

The processor 112 may employ one designed and/or manufactured as one or more single or multi-chip microprocessors.

The memory 113 and the non-volatile storage 114 are storage media that can be read by the computer 102. For example, the memory 113 can employ any suitable volatile storage device such as DRAM (Dynamic Random Access Memory) or SRAM (Static RAM). The non-volatile storage 114 can employ at least one or more of a flexible disk, a hard disk, an SSD (Solid State Drive), a ROM (Read Only Memory), an EPROM (Erasable and Programmable Read Only Memory), a flash memory, a compact disk (CD or CD-ROM), and a DVD (Digital Versatile Disc), a card-type memory, and a stick-type memory.

Further, a program 121 is stored in the non-volatile storage 114. The program 121 is, for example, a collection of machine-readable instructions and/or data used to create, manage, and control specific software functions. In a configuration in which the memory 113 is much faster than the non-volatile storage 114, the program 121 can be transferred from the non-volatile storage 114 to the memory 113 before being executed by the processor 112.

The computer 102 can communicate and interact with other computers via the network 103 via the network interface 115. The network 103 may adopt, for example, a configuration including a wired, wireless, or optical fiber connection using a LAN (Local Area Network), a WAN (Wide Area Network) such as the Internet, or a combination of IAN and WAN. In general, the network 103 consists of any combination of connections and protocols that support communication between two or more computers and related devices.

The peripheral interface 116 can input and output data to and from other devices that may be locally connected to the computer 102. For example, the peripheral interface 116 provides a connection to an external device 131. The external device 131 includes a keyboard, mouse, keypad, touch screen, and/or other suitable input device. The external device 131 may also include, for example, a thumb drive, a portable optical or magnetic disk, and a portable computer readable storage medium such as a memory card.

In embodiments of the present disclosure, for example, the software and data used to implement the program 121 may be stored in such a portable computer readable storage medium. In such embodiments, the software may be loaded directly into the non-volatile storage 114 or directly into the memory 113 via the peripheral interface 116. The peripheral interface 116 may use an industry standard such as RS-232 or USB (Universal Serial Bus) for connection with the external device 131.

The display interface 117 can connect the computer 102 to the display 132, and can present a command line or graphical user interface to the user of the computer 102 using the display 132. For example, the display interface 117 may employ industry standards such as VGA (Video Graphics Array), DVI (Digital Visual Interface), DisplayPort, and HDMI (High-Definition Multimedia Interface) (registered trademark).

<Configuration Example of Image Encoding Device>

Figure 10:
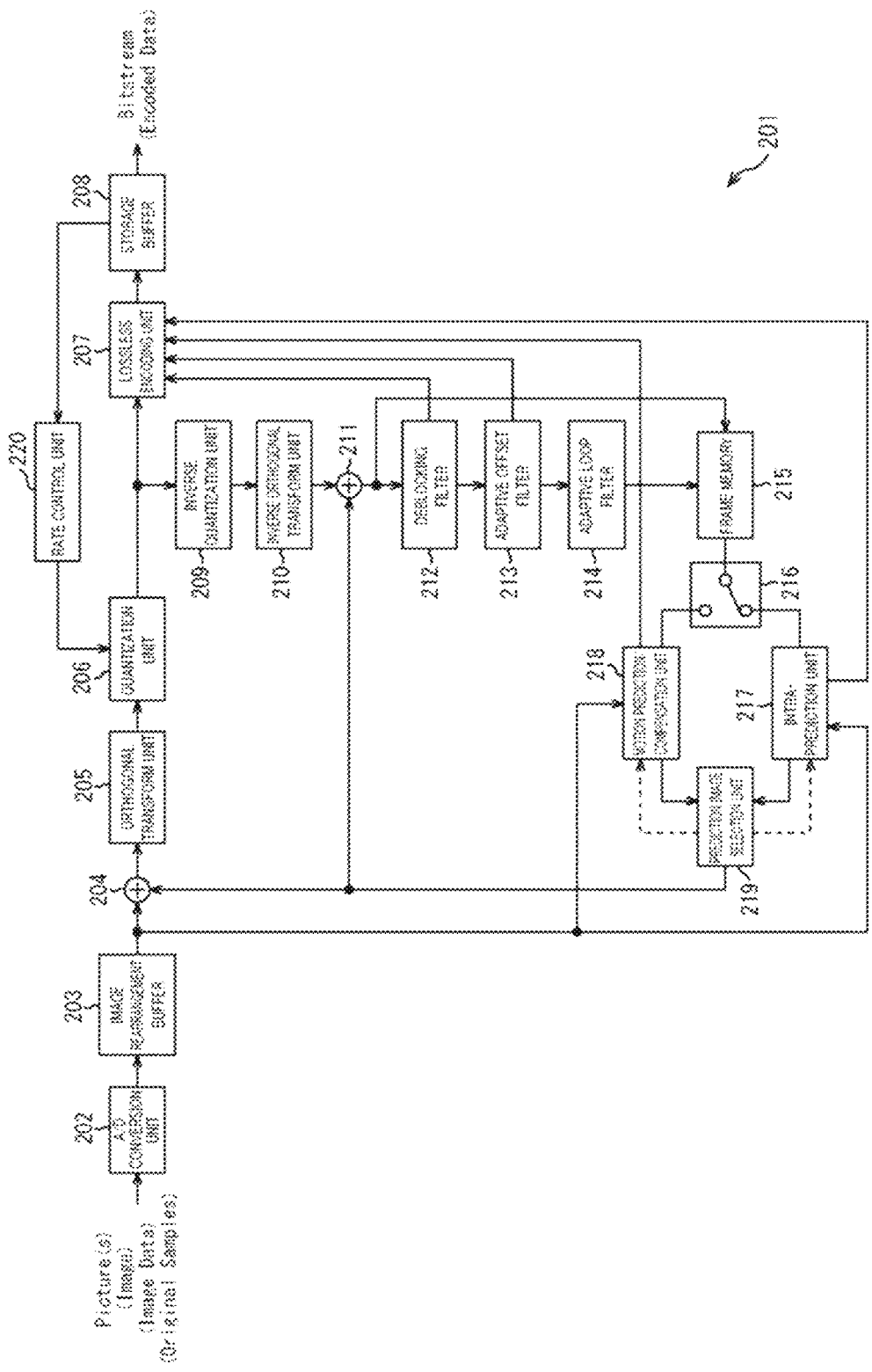
FIG. 10 is a block diagram showing a configuration example of an embodiment of an image encoding device.

FIG. 10 shows the configuration of an embodiment of an image encoding device as an image processing device to which the present disclosure is applied.

An image encoding device 201 shown in FIG. 10 encodes image data using prediction processing. Here, as the encoding method, for example, a VVC (Versatile Video Coding) method, a HEVC (High Efficiency Video Coding) method, or the like is used.

The image encoding device 201 of FIG. 10 has an A/D conversion unit 202, a screen rearrangement buffer 203, a calculation unit 204, an orthogonal transform unit 205, a quantization unit 206, a lossless encoding unit 207, and a storage buffer 208. Further, the image encoding device 201 includes an inverse quantization unit 209, an inverse orthogonal transform unit 210, a calculation unit 211, a deblocking filter 212, an adaptive offset filter 213, an adaptive loop filter 214, a frame memory 215, a selection unit 216, an intra-prediction unit 217, a motion prediction/ compensation unit 218, a prediction image selection unit 219, and a rate control unit 220.

The A/D conversion unit 202 performs A/D conversion of the input image data (Picture(s)) and supplies the same to the screen rearrangement buffer 203. It should be noted that an image of digital data may be input without providing the A/D conversion unit 202.

The screen rearrangement buffer 203 stores the image data supplied from the A/D conversion unit 202, and encodes the images of the frames in the stored display order according to the GOP (Group of Picture) structure. Sort by frame order. The screen rearrangement buffer 203 outputs the image in which the order of the frames is rearranged to the calculation unit 204, the intra-prediction unit 217, and the motion prediction/compensation unit 218.

The calculation unit 204 subtracts the prediction image supplied from the intra-prediction unit 217 or the motion prediction/compensation unit 218 via the prediction image selection unit 219 from the image output from the screen rearrangement buffer 203 to obtain the difference information, and output the same to the orthogonal transform unit 205.

For example, in the case of an image to be intra-encoded, the calculation unit 204 subtracts the prediction image supplied from the intra-prediction unit 217 from the image output from the screen rearrangement buffer 203. Further, for example, in the case of an image to be inter-encoded, the calculation unit 204 subtracts the prediction image supplied from the motion prediction/compensation unit 218 from the image output from the screen rearrangement buffer 203.

The orthogonal transform unit 205 performs orthogonal transform such as discrete cosine transform and Karhunen-Loeve transform on the difference information supplied from the calculation unit 204, and supplies the transform coefficient to the quantization unit 206.

The quantization unit 206 quantizes the transform coefficient output by the orthogonal transform unit 205. The quantization unit 206 supplies the quantized transform coefficient to the lossless encoding unit 207.

The lossless encoding unit 207 applies lossless encoding such as variable-length encoding and arithmetic encoding to the quantized transform coefficient.

The lossless encoding unit 207 acquires parameters such as information indicating the intra-prediction mode from the intra-prediction unit 217, and acquires parameters such as information indicating the inter-prediction mode and motion vector information from the motion prediction/compensation unit 218.

The lossless encoding unit 207 encodes the quantized transform coefficient and encodes the acquired parameters (syntax elements) to include (multiplex) the same in a part of the header information of the encoded data. The lossless encoding unit 207 supplies the encoded data obtained by encoding to the storage buffer 208 and stores the same therein.

For example, the lossless encoding unit 207 performs a lossless encoding process such as variable-length encoding or arithmetic encoding. Examples of variable-length encoding include CAVLC (Context-Adaptive Variable Length Coding). Examples of arithmetic encoding include CABAC (Context-Adaptive Binary Arithmetic Coding).

The storage buffer 208 temporarily holds the encoded stream (Encoded Data) supplied from the lossless encoding unit 207, and outputs the encoded stream to a recording device or transmission path (not shown) in the subsequent stage, for example, as an encoded image at a predetermined timing. That is, the storage buffer 208 is also a transmission unit that transmits an encoded stream.

Further, the transform coefficient quantized in the quantization unit 206 is also supplied to the inverse quantization unit 209. The inverse quantization unit 209 dequantizes the quantized transform coefficient by a method corresponding to the quantization by the quantization unit 206. The inverse quantization unit 209 supplies the obtained transform coefficient to the inverse orthogonal transform unit 210.

The inverse orthogonal transform unit 210 performs inverse orthogonal transform on the supplied transform coefficient by a method corresponding to the orthogonal transform process by the orthogonal transform unit 205. The output (restored difference information) that has been subject to inverse orthogonal transform is supplied to the calculation unit 211.

The calculation unit 211 adds the prediction image supplied from the intra-prediction unit 217 or the motion prediction/compensation unit 218 via the prediction image selection unit 219 to the inverse orthogonal transform result supplied from the inverse orthogonal transform unit 210, that is, the restored difference information to obtain a locally decoded image (decoded image).

For example, when the difference information corresponds to an image to be intra-encoded, the calculation unit 211 adds the prediction image supplied from the intra-prediction unit 217 to the difference information. Further, for example, when the difference information corresponds to an image to be inter encoded, the calculation unit 211 adds the prediction image supplied from the motion prediction/compensation unit 218 to the difference information.

The decoded image which is the addition result is supplied to the deblocking filter 212 and the frame memory 215.

The deblocking filter 212 suppresses the block distortion of the decoded image by appropriately performing the deblocking filter processing on the image from the calculation unit 211, and supplies the filter processing result to the adaptive offset filter 213. The deblocking filter 212 has parameters ß and Tc obtained based on a quantization parameter QP. The parameters ß and R, are threshold values (parameters) used for determination regarding the deblocking filter.

The parameters ß and Tc of the deblocking filter 212 are extended from ß and T defined by the HEVC method. Each offset of the parameters ß and Tc is encoded by the lossless encoding unit 207 as a parameter of the deblocking filter, and is transmitted to the image decoding device 301 of FIG. 12, which will be described later.

The adaptive offset filter 213 mainly performs an offset filter (SAO: Sample adaptive offset) process for suppressing ringing on the image filtered by the deblocking filter 212.

There are nine types of offset filters, two types of band offset, six types of edge offset, and no offset. The adaptive offset filter 213 applies filter processing on the image filtered by the deblocking filter 212 using a quad-tree structure in which the type of offset filter is determined for each divided area and an offset value for each divided area. The adaptive offset filter 213 supplies the filtered image to the adaptive loop filter 214.

In the image encoding device 201, the quad-tree structure and the offset value for each divided area are calculated and used by the adaptive offset filter 213. The calculated quad-tree structure and the offset value for each divided area are encoded by the lossless encoding unit 207 as an adaptive offset parameter and transmitted to the image decoding device 301 of FIG. 12, which will be described later.

The adaptive loop filter 214 performs adaptive loop filter (ALF: Adaptive Loop Filter) processing for each processing unit on the image filtered by the adaptive offset filter 213 using the filter coefficient. In the adaptive loop filter 214, for example, a two-dimensional Wiener filter is used as the filter. Of course, a filter other than the Wiener filter may be used. The adaptive loop filter 214 supplies the filter processing result to the frame memory 215.

Although not shown in the example of FIG. 10, in the image encoding device 201, the filter coefficient calculated and used by the adaptive loop filter 214 for each processing unit so as to minimize the residue from the original image from the screen rearrangement buffer 203. The calculated filter coefficient is encoded by the lossless encoding unit 207 as an adaptive loop filter parameter and transmitted to the image decoding device 301 of FIG. 12, which will be described later.

The frame memory 215 outputs the stored reference image to the intra-prediction unit 217 or the motion prediction/compensation unit 218 via the selection unit 216 at a predetermined timing.

For example, in the case of an image to be intra-encoded, the frame memory 215 supplies the reference image to the intra-prediction unit 217 via the selection unit 216. Further, for example, when inter-encoding is performed, the frame memory 215 supplies the reference image to the motion prediction/compensation unit 218 via the selection unit 216.

When the reference image supplied from the frame memory 215 is an image to be intra-encoded, the selection unit 216 supplies the reference image to the intra-prediction unit 217. Further, when the reference image supplied from the frame memory 215 is an image to be inter-encoded, the selection unit 216 supplies the reference image to the motion prediction/compensation unit 218.

The intra-prediction unit 217 performs intra-prediction (in-screen prediction) that generates a prediction image using the pixel values in the screen. The intra-prediction unit 217 performs intra-prediction in a plurality of modes (intra-prediction modes).

The intra-prediction unit 217 generates a prediction image in all intra-prediction modes, evaluates each prediction image, and selects the optimum mode. When the optimum intra-prediction mode is selected, the intra-prediction unit 217 supplies the prediction image generated in the optimum mode to the calculation unit 204 and the calculation unit 211 via the prediction image selection unit 219.

Further, as described above, the intra-prediction unit 217 supplies parameters such as intra-prediction mode information indicating the adopted intra-prediction mode to the lossless encoding unit 207 as appropriate.

The motion prediction/compensation unit 218 performs motion prediction on the image to be inter-encoded using the input image supplied from the screen rearrangement buffer 203 and the reference image supplied from the frame memory 215 via the selection unit 216. Further, the motion prediction/compensation unit 218 performs motion compensation processing according to the motion vector detected by the motion prediction, and generates a prediction image (inter-prediction image information).

The motion prediction/compensation unit 218 performs inter-prediction processing in all candidate inter-prediction modes and generates a prediction image. The motion prediction/compensation unit 218 supplies the generated prediction image to the calculation unit 204 and the calculation unit 211 via the prediction image selection unit 219. Further, the motion prediction/compensation unit 218 supplies parameters such as inter-prediction mode information indicating the adopted inter-prediction mode and motion vector information indicating the calculated motion vector to the lossless encoding unit 207.

The prediction image selection unit 219 supplies the output of the intra-prediction unit 217 to the calculation unit 204 and the calculation unit 211 in the case of an image to be intra-encoded, and supplies the output of the motion prediction/compensation unit 218 to the calculation unit 204 and the calculation unit 211 in the case of an image to be inter-encoded.

The rate control unit 220 controls the rate of the quantization operation of the quantization unit 206 so that overflow or underflow does not occur based on the compressed image stored in the storage buffer 208.

The image encoding device 201 is configured in this way, and the lossless encoding unit 207 corresponds to the encoding unit 22 in FIG. 5. Therefore, the image encoding device 201 can perform encoding with a line buffer having a smaller size, as described above.

<Operation of Image Encoding Device>

Figure 11:
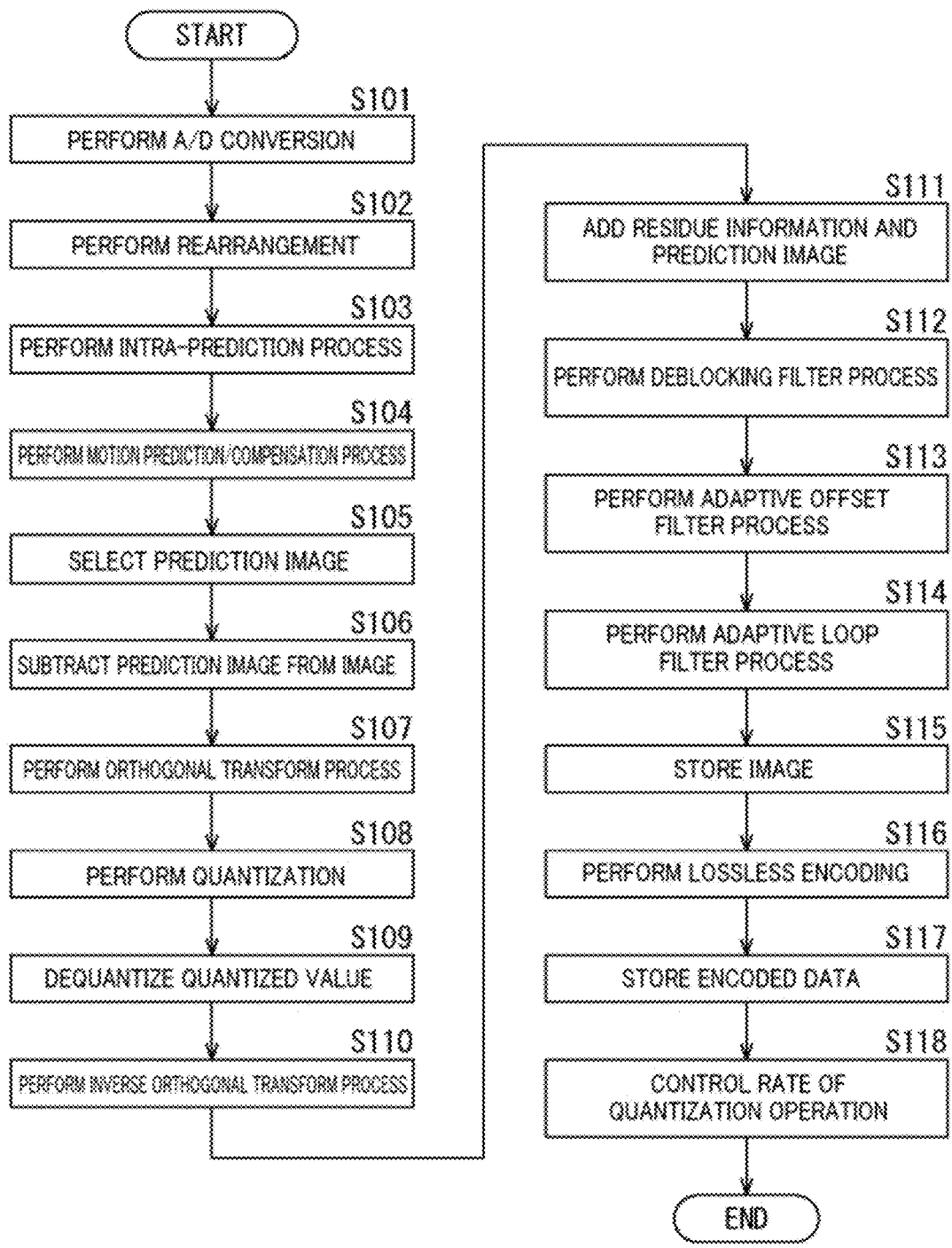
FIG. 11 is a flowchart illustrating an encoding process.

With reference to FIG. 11, the flow of the encoding process executed by the image encoding device 201 as described above will be described.

In step S101, the A/D conversion unit 202 performs A/D conversion of the input image.

In step S102, the screen rearrangement buffer 203 stores the image A/l-converted by the A/D conversion unit 202, and rearranges the image from the display order of each picture to the encoding order.

When the processing target image supplied from the screen rearrangement buffer 203 is an image of a block to be intra-processed, the referenced decoded image is read from the frame memory 215 and is supplied to the intra-prediction unit 217 via the selection unit 216.

Based on these images, in step S103, the intra-prediction unit 217 intra-predicts the pixels of the processing target block in all candidate intra-prediction modes. As the referenced decoded pixel, a pixel not filtered by the deblocking filter 212 is used.

By this process, the intra-prediction is performed in all candidate intra-prediction modes, and the cost function value is calculated for all candidate intra-prediction modes. Then, the optimum intra-prediction mode is selected based on the calculated cost function value, and the prediction image generated by the intra-prediction in the optimum intra-prediction mode and the cost function value thereof are supplied to the prediction image selection unit 219.

When the processing target image supplied from the screen rearrangement buffer 203 is an image to be inter-processed, the referenced image is read from the frame memory 215 and supplied to the motion prediction/compensation unit 218 via the selection unit 216. Based on these images, in step S104, the motion prediction/compensation unit 218 performs motion prediction/compensation processing.

By this processing, motion prediction processing is performed in all candidate inter-prediction modes, cost function values are calculated for all candidate inter prediction modes, and the optimum inter-prediction mode is determined based on the calculated cost function values. Then, the prediction image generated by the optimum inter-prediction mode and the cost function value thereof are supplied to the prediction image selection unit 219.

In step S105, the prediction image selection unit 219 determines one of the optimum intra-prediction mode and the optimum inter-prediction mode as the optimum prediction mode based on the cost function values output from the intra-prediction unit 217 and the motion prediction/compensation unit 218. Then, the prediction image selection unit 219 selects the prediction image in the determined optimum prediction mode and supplies the prediction image to the calculation units 204 and 211. This prediction image is used for the calculation of steps S106 and S111 described later.

The selection information of the prediction image is supplied to the intra-prediction unit 217 or the motion prediction/compensation unit 218. When the prediction image of the optimum intra-prediction mode is selected, the intra-prediction unit 217 supplies information indicating the optimum intra-prediction mode (that is, parameters related to the intra-prediction) to the lossless encoding unit 207.

When the prediction image of the optimum inter-prediction mode is selected, the motion prediction/compensation unit 218 outputs information indicating the optimum inter-prediction mode and the information corresponding to the optimum inter-prediction mode (that is, parameters related to the motion prediction) to the lossless encoding unit 207. Examples of the information corresponding to the optimum inter-prediction mode include motion vector information and reference frame information.

In step S106, the calculation unit 204 calculates the difference between the images rearranged in step S102 and the prediction image selected in step S105. The prediction image is supplied to the calculation unit 204 from the motion prediction/compensation unit 218 in the case of inter-prediction and from the intra-prediction unit 217 in the case of intra-prediction via the prediction image selection unit 219.

The amount of difference data is smaller than that of the original image data. Therefore, the amount of data can be compressed as compared with the case where the image is encoded as it is.

In step S107, the orthogonal transform unit 205 performs orthogonal transform on the difference information supplied from the calculation unit 204. Specifically, orthogonal transform such as discrete cosine transform and Karhunen-Loeve transform is performed, and the transform coefficient is output.

In step S108, the quantization unit 206 quantizes the transform coefficient. In this quantization, the rate is controlled as described in the process of step S118 described later.

The difference information quantized as described above is locally decoded as follows. That is, in step S109, the inverse quantization unit 209 dequantizes the transform coefficient quantized by the quantization unit 206 with the characteristics corresponding to the characteristics of the quantization unit 206. In step S110, the inverse orthogonal transform unit 210 performs inverse orthogonal transform on the transform coefficient dequantized by the inverse quantization unit 209 with the characteristics corresponding to the characteristics of the orthogonal transform unit 205.

In step S111, the calculation unit 211 adds the prediction image input via the prediction image selection unit 219 to the locally decoded difference information to generate the locally decoded image (image corresponding to the input to the calculation unit 204).

In step S112, the deblocking filter 212 performs deblocking filter processing on the image output from the calculation unit 211. At this time, as the threshold value for the determination regarding the deblocking filter, the parameters ß and Tc extended from ß and Tb defined by the HEVC method are used. The filtered image from the deblocking filter 212 is output to the adaptive offset filter 213.

It should be noted that the offsets of the parameters ß and Tc used in the deblocking filter 212, which are input by the user operating the operation unit or the like, are supplied to the lossless encoding unit 207 as the parameters of the deblocking filter.

In step S113, the adaptive offset filter 213 performs adaptive offset filter processing. By this processing, filter processing is applied to the image filtered by the deblocking filter 212 using a quad-tree structure in which the type of offset filter is determined for each divided area and an offset value for each divided area. The filtered image is supplied to the adaptive loop filter 214.

The determined quad-tree structure and the offset value for each divided area are supplied to the lossless encoding unit 207 as an adaptive offset parameter.

In step S114, the adaptive loop filter 214 performs adaptive loop filter processing on the image filtered by the adaptive offset filter 213. For example, the image filtered by the adaptive offset filter 213 is filtered for each processing unit using the filter coefficient, and the filter processing result is supplied to the frame memory 215.

In step S115, the frame memory 215 stores the filtered image. Images not filtered by the deblocking filter 212, the adaptive offset filter 213, and the adaptive loop filter 214 are also supplied from the calculation unit 211 and stored in the frame memory 215.

On the other hand, the transform coefficient quantized in step S108 described above is also supplied to the lossless encoding unit 207. In step S116, the lossless encoding unit 207 encodes the quantized transform coefficient output from the quantization unit 206 and the supplied parameters. That is, the difference image is losslessly encoded and compressed by variable-length encoding, arithmetic encoding, and the like. Here, examples of the encoded parameters include deblocking filter parameters, adaptive offset filter parameters, adaptive loop filter parameters, quantization parameters, motion vector information and reference frame information, prediction mode information, and the like.

In step S117, the storage buffer 208 stores the encoded difference image (that is, the encoded stream) as a compressed image. The compressed image stored in the storage buffer 208 is appropriately read and transmitted to the decoding side via the transmission path.

In step S118, the rate control unit 220 controls the rate of the quantization operation of the quantization unit 206 so that overflow or underflow does not occur based on the compressed image stored in the storage buffer 208.

When the process of step S118 ends, the encoding process ends.

In the above-described encoding process, when lossless encoding is performed in step S116, the image is encoded according to the VVC method in which the horizontal size of one tile is restricted for each level as described above, and a bitstream is generated.

<Configuration Example of Image Decoding Device>

Figure 12:
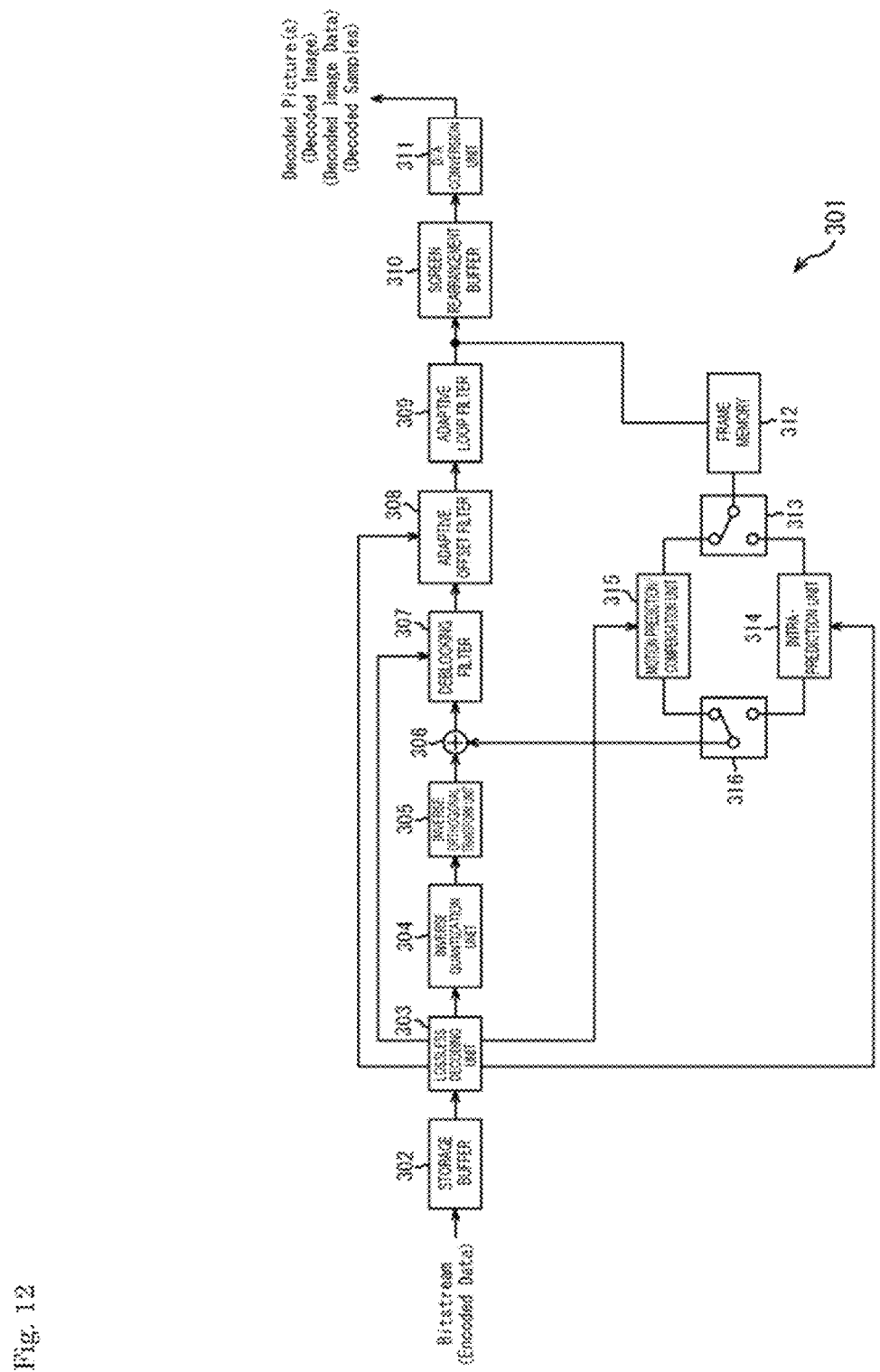
FIG. 12 is a block diagram showing a configuration example of an embodiment of an image decoding device.

FIG. 12 shows the configuration of an embodiment of an image decoding device as an image processing device to which the present disclosure is applied. An image decoding device 301 shown in FIG. 12 is a decoding device corresponding to the image encoding device 201 of FIG. 10.

It is assumed that the encoded stream (Encoded Data) encoded by the image encoding device 201 is transmitted to and decoded by the image decoding device 301 corresponding to the image encoding device 201 via a predetermined transmission path.

As shown in FIG. 12, the image decoding device 301 includes a storage buffer 302, a lossless decoding unit 303, an inverse quantization unit 304, an inverse orthogonal transform unit 305, an calculation unit 306, a deblocking filter 307, an adaptive offset filter 308, an adaptive loop filter 309, a screen rearrangement buffer 310, a D/A conversion unit 311, a frame memory 312, a selection unit 313, an intra-prediction unit 314, a motion prediction/compensation unit 315, and a selection unit 316.

The storage buffer 302 is also a receiving unit that receives the transmitted encoded data. The storage buffer 302 receives and stores the transmitted encoded data. This encoded data is encoded by the image encoding device 201. The lossless decoding unit 303 decodes the encoded data read from the storage buffer 302 at a predetermined timing by a method corresponding to the encoding method of the lossless encoding unit 207 of FIG. 10.

The lossless decoding unit 303 supplies parameters such as information indicating the decoded intra-prediction mode to the intra-prediction unit 314, and supplies parameters such as information indicating the inter-prediction mode and motion vector information to the motion prediction/compensation unit 315. Further, the lossless decoding unit 303 supplies the decoded deblocking filter parameters to the deblocking filter 307, and supplies the decoded adaptive offset parameters to the adaptive offset filter 308.

The inverse quantization unit 304 dequantizes the coefficient data (quantization coefficient) decoded by the lossless decoding unit 303 by a method corresponding to the quantization method of the quantization unit 206 of FIG. 10. That is, the inverse quantization unit 304 performs inverse quantization of the quantization coefficient by the same method as the inverse quantization unit 209 of FIG. 10 using the quantization parameters supplied from the image encoding device 201.

The inverse quantization unit 304 supplies the dequantized coefficient data, that is, the orthogonal transform coefficient to the inverse orthogonal transform unit 305. The inverse orthogonal transform unit 305 performs inverse orthogonal transform on the orthogonal transform coefficient by a method corresponding to the orthogonal transform method of the orthogonal transform unit 205 of FIG. 10 to obtain decoded residue data corresponding to the residue data before being subject to orthogonal transform in the image encoding device 201.

The decoded residue data obtained by the inverse orthogonal transform is supplied to the calculation unit 306. Further, the calculation unit 306 is supplied with a prediction image from the intra-prediction unit 314 or the motion prediction/compensation unit 315 via the selection unit 316.

The calculation unit 306 adds the decoded residue data and the prediction image to obtain the decoded image data corresponding to the image data before the prediction image is subtracted by the calculation unit 204 of the image encoding device 201. The calculation unit 306 supplies the decoded image data to the deblocking filter 307.

The deblocking filter 307 suppresses the block distortion of the decoded image by appropriately performing the deblocking filter processing on the image from the calculation unit 306, and supplies the filter processing result to the adaptive offset filter 308. The deblocking filter 307 is basically configured in the same manner as the deblocking filter 212 of FIG. 10. That is, the deblocking filter 307 has parameters ß and Tc obtained based on the quantization parameters. The parameters ß and Tc are threshold values used for determination regarding the deblocking filter.

The parameters ß and Tc of the deblocking filter 307 are extended from ß and Tc defined by the HEVC method. Each offset of the parameters ß and Tc of the deblocking filter encoded by the image encoding device 201 is received by the image decoding device 301 as a parameter of the deblocking filter, decoded by the lossless decoding unit 303, and used by the deblocking filter 307.

The adaptive offset filter 308 mainly performs offset filter (SAO) processing for suppressing ringing on the image filtered by the deblocking filter 307.

The adaptive offset filter 308 applies filter processing on the image filtered by the deblocking filter 307 using a quad-tree structure in which the type of offset filter is determined for each divided area and an offset value for each divided area. The adaptive offset filter 308 supplies the filtered image to the adaptive loop filter 309.

The quad-tree structure and the offset value for each divided area are calculated by the adaptive offset filter 213 of the image encoding device 201, encoded as an adaptive offset parameter, and sent. Then, the quad-tree structure and the offset value for each divided area encoded by the image encoding device 201 are received by the image decoding device 301 as an adaptive offset parameter, decoded by the lossless decoding unit 303, and used by the adaptive offset filter 308.

The adaptive loop filter 309 performs filter processing on the image filtered by the adaptive offset filter 308 for each processing unit using the filter coefficient, and supplies the filter processing result to the frame memory 312 and the screen rearrangement buffer 310.

Although not shown in the example of FIG. 12, in the image decoding device 301, the filter coefficient is calculated for each LUC by the adaptive loop filter 214 of the image encoding device 201, encoded and sent as an adaptive loop filter parameter, and decoded and used by the lossless decoding unit 303.

The screen rearrangement buffer 310 performs rearrangement of the images and supplies the same to the D/A conversion unit 311. That is, the order of the frames rearranged for the encoding order by the screen rearrangement buffer 203 of FIG. 10 is rearranged in the original display order.

The D/A conversion unit 311 performs D/A conversion on an image (Decoded Picture(s)) supplied from the screen rearrangement buffer 310, outputs the image to a display (not shown), and displays the image. In addition, the image may be output as it is as digital data without providing the D/A conversion unit 311.

The output of the adaptive loop filter 309 is also supplied to the frame memory 312.

The frame memory 312, the selection unit 313, the intra-prediction unit 314, the motion prediction/compensation unit 315, and the selection unit 316 correspond to the frame memory 215, the selection unit 216, the intra-prediction unit 217, the motion prediction/compensation unit 218, and the prediction image selection unit 219 of the image encoding device 201, respectively.

The selection unit 313 reads the image to be inter-processed and the referenced image from the frame memory 312, and supplies the same to the motion prediction/compensation unit 315. Further, the selection unit 313 reads the image used for the intra-prediction from the frame memory 312 and supplies the same to the intra-prediction unit 314.

Information indicating the intra-prediction mode obtained by decoding the header information and the like are appropriately supplied from the lossless decoding unit 303 to the intra-prediction unit 314. Based on this information, the intra-prediction unit 314 generates a prediction image from the reference image acquired from the frame memory 312, and supplies the generated prediction image to the selection unit 316.

Information obtained by decoding the header information (prediction mode information, motion vector information, reference frame information, flags, various parameters, and the like) is supplied from the lossless decoding unit 303 to the motion prediction/compensation unit 315.

The motion prediction/compensation unit 315 generates a prediction image from the reference image acquired from the frame memory 312 based on the information supplied from the lossless decoding unit 303, and supplies the generated prediction image to the selection unit 316.

The selection unit 316 selects a prediction image generated by the motion prediction/compensation unit 315 or the intra-prediction unit 314 and supplies the same to the calculation unit 306.

The image decoding device 301 is configured in this way, and the lossless decoding unit 303 corresponds to the decoding unit 32 of FIG. 5. Therefore, as described above, the image decoding device 301 can perform decoding with a line buffer having a smaller size.

<Operation of Image Decoding Device>

Figure 13:
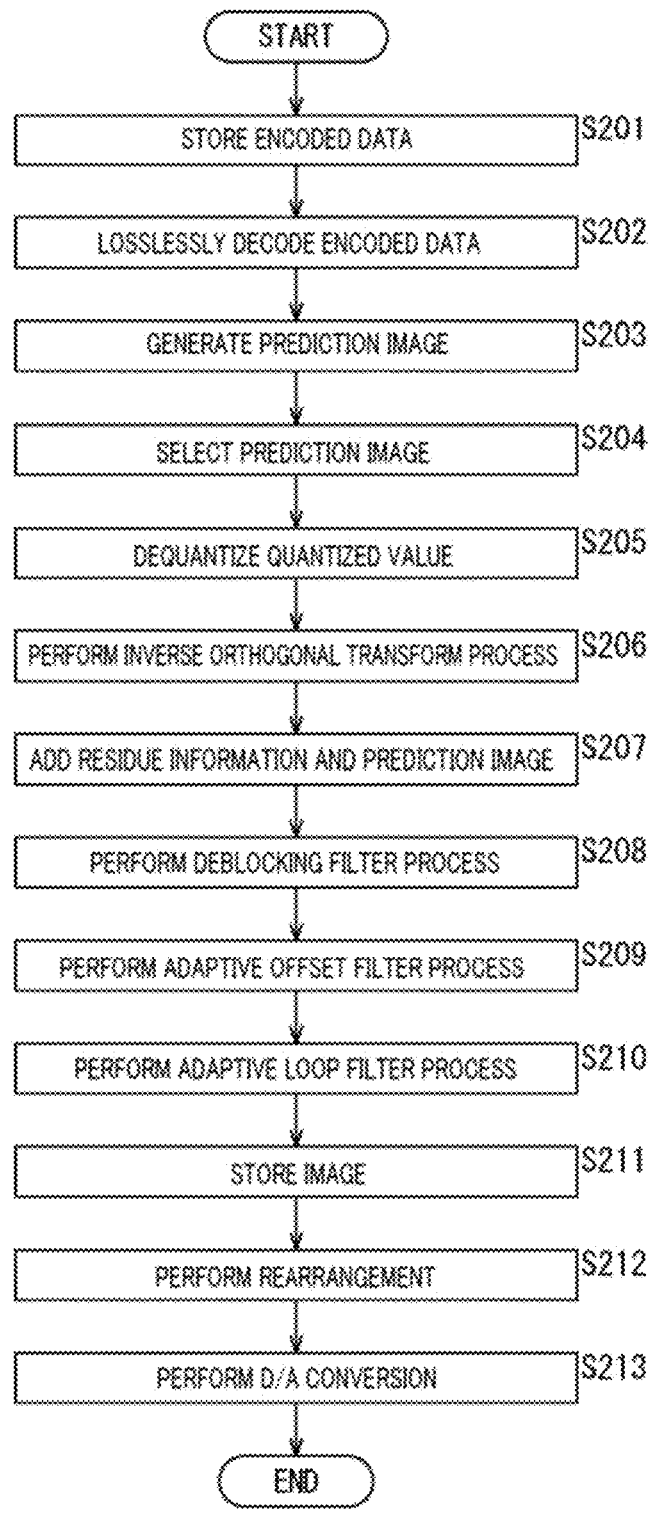
FIG. 13 is a flowchart illustrating a decoding process.

With reference to FIG. 13, an example of the flow of the decoding process executed by the image decoding device 301 as described above will be described.

When the decoding process is started, in step S201, the storage buffer 302 receives and stores the transmitted encoded stream (data). In step S202, the lossless decoding unit 303 decodes the encoded data supplied from the storage buffer 302. The I picture, P picture, and B picture encoded by the lossless encoding unit 207 of FIG. 10 are decoded.

Prior to decoding the picture, parameter information such as motion vector information, reference frame information, and prediction mode information (intra-prediction mode or inter-prediction mode) is also decoded.

When the prediction mode information is the intra-prediction mode information, the prediction mode information is supplied to the intra-prediction unit 314. When the prediction mode information is inter-prediction mode information, the prediction mode information and the corresponding motion vector information and the like are supplied to the motion prediction/compensation unit 315. The deblocking filter parameters and the adaptive offset parameter are also decoded and supplied to the deblocking filter 307 and the adaptive offset filter 308, respectively.

In step S203, the intra-prediction unit 314 or the motion prediction/compensation unit 315 each performs a prediction image generation process corresponding to the prediction mode information supplied from the lossless decoding unit 303.

That is, when the intra-prediction mode information is supplied from the lossless decoding unit 303, the intra-prediction unit 314 generates an intra-prediction image of the intra-prediction mode. When the inter-prediction mode information is supplied from the lossless decoding unit 303, the motion prediction/compensation unit 315 performs the motion prediction/compensation processing in the inter-prediction mode and generates the inter-prediction image.

By this processing, the prediction image (intra-prediction image) generated by the intra-prediction unit 314 or the prediction image (inter-prediction image) generated by the motion prediction/compensation unit 315 is supplied to the selection unit 316.

In step S204, the selection unit 316 selects a prediction image. That is, the prediction image generated by the intra-prediction unit 314 or the prediction image generated by the motion prediction/compensation unit 315 is supplied. Therefore, the supplied prediction image is selected and supplied to the calculation unit 306, and is added to the output of the inverse orthogonal transform unit 305 in step S207 described later.

In step S202 described above, the transform coefficient decoded by the lossless decoding unit 303 is also supplied to the inverse quantization unit 304. In step S205, the inverse quantization unit 304 dequantizes the transform coefficient decoded by the lossless decoding unit 303 with characteristics corresponding to the characteristics of the quantization unit 206 of FIG. 10.

In step S206, the inverse orthogonal transform unit 305 performs inverse orthogonal transform on the transform coefficients dequantized by the inverse quantization unit 304 with the characteristics corresponding to the characteristics of the orthogonal transform unit 205 of FIG. 10. As a result, the difference information corresponding to the input of the orthogonal transform unit 205 (output of the calculation unit 204) in FIG. 10 is decoded.

In step S207, the calculation unit 306 adds the prediction image selected in the process of step S204 described above and input via the selection unit 316 to the difference information. In this way, the original image is decoded.

In step S208, the deblocking filter 307 performs deblocking filter processing on the image output from the calculation unit 306. At this time, as the threshold value for the determination regarding the deblocking filter, the parameters ß and Tc extended from ß and Tb defined by the HEVC method are used. The filtered image from the deblocking filter 307 is output to the adaptive offset filter 308. In the deblocking filter processing, each offset of the deblocking filter parameters ß and Tc supplied from the lossless decoding unit 303 is also used.

In step S209, the adaptive offset filter 308 performs adaptive offset filter processing. By this processing, the filter processing is performed on the image filtered by the deblocking filter 307 using the quad-tree structure in which the type of the offset filter is determined for each divided area and the offset value for each divided area. The filtered image is supplied to the adaptive loop filter 309.

In step S210, the adaptive loop filter 309 performs adaptive loop filter processing on the image filtered by the adaptive offset filter 308. The adaptive loop filter 309 performs filter processing on the input image for each processing unit using the filter coefficient calculated for each processing unit, and supplies the filter processing result to the screen rearrangement buffer 310 and the frame memory 312.

In step S211 the frame memory 312 stores the filtered image.

In step S212, the screen rearrangement buffer 310 rearranges the images filtered by the adaptive loop filter 309 and then supplies the images to the D/A conversion unit 311. That is, the order of the frames rearranged for encoding by the screen rearrangement buffer 203 of the image encoding device 201 is rearranged in the original display order.

In step S213, the D/A conversion unit 311 performs D/A conversion on the images rearranged by the screen rearrangement buffer 310 and outputs the same to a display (not shown), and the images are displayed.

When the process of step S213 ends, the decoding process ends.

In the above-described decoding process, when lossless decoding is performed in step S202, the encoded data (bitstream) is decoded according to the VVC method in which the horizontal size of one tile is restricted for each level as described above, and the image is generated.

<Configuration Example of Computer>

The above-described series of processing (image processing method) can be executed by hardware or software. In a case where the series of processing is executed by software, a program that configures the software is installed in a general-purpose computer or the like.

Figure 14:
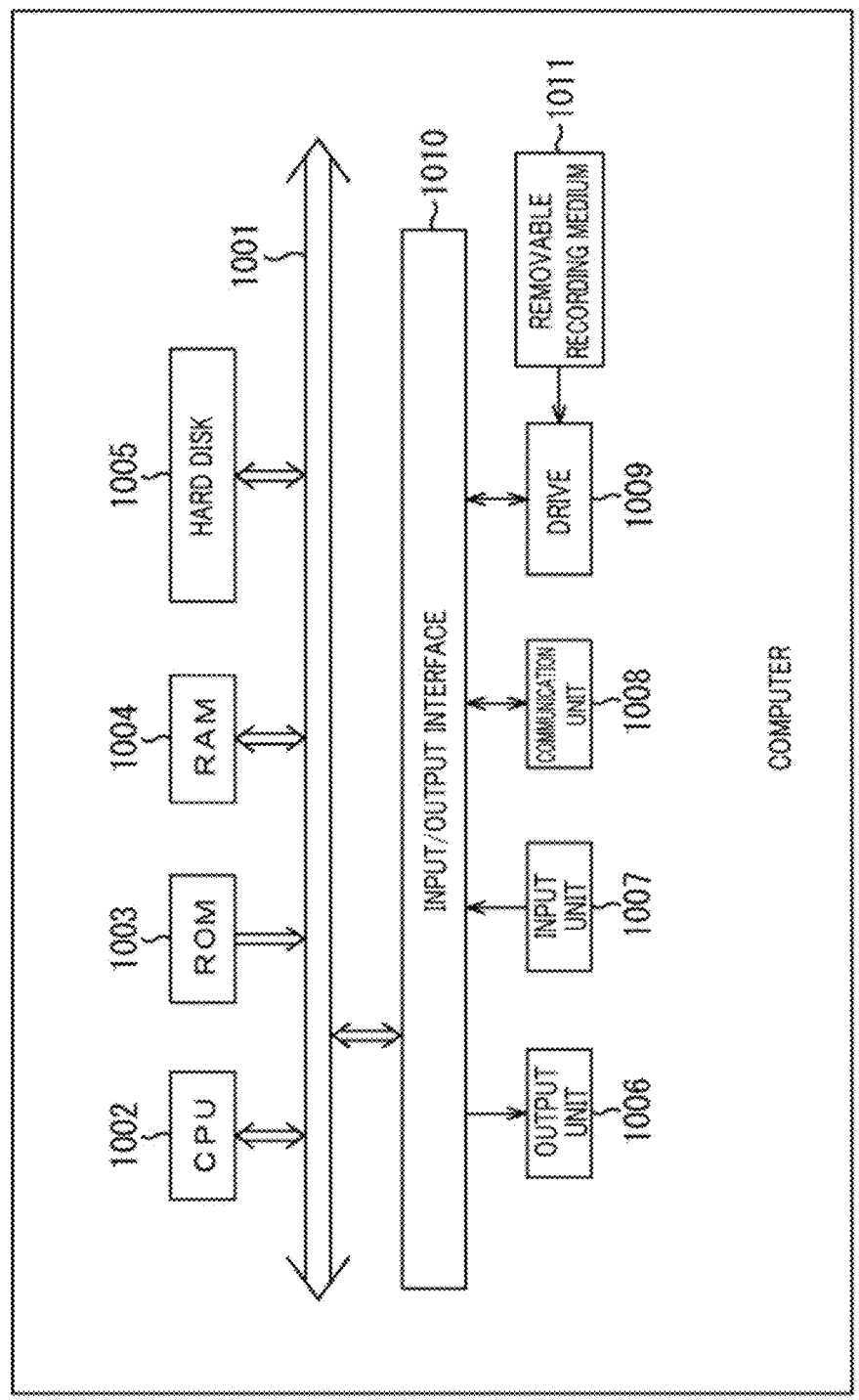
FIG. 14 is a block diagram showing a configuration example of an embodiment of a computer to which the present technology is applied.

FIG. 14 is a block diagram showing an example of a configuration of an embodiment of a computer in which a program for executing the aforementioned series of processing is installed.

The program can be recorded in advance in a hard disk 1005 or a ROM 1003 as a recording medium included in the computer.

Alternatively, the program can be stored (recorded) in a removable recording medium 1011 driven by a drive 1009. The removable recording medium 1011 can be provided as so-called package software. Here, there is a flexible disk, a compact disc read only memory (CD-ROM), a magneto optical (MO) disk, a digital versatile disc (DVD), a magnetic disk, a semiconductor memory, or the like, for example, as the removable recording medium 1011.

Note that the program can be downloaded to the computer through a communication network or a broadcast network and installed in the hard disk 1005 included in the computer in addition to being installed from the aforementioned removable recording medium 1011 to the computer. That is, the program can be transmitted from a download site to the computer through an artificial satellite for digital satellite broadcast in a wireless manner or transmitted to the computer through a network such as a local area network (LAN) or the Internet in a wired manner, for example.

The computer includes a central processing unit (CPU) 1002 and an input/output interface 1010 is connected to the CPU 1002 through a bus 1001.

When a user operates the input unit 1007, or the like to input a command through the input/output interface 1010, the CPU 1002 executes a program stored in the read only memory (ROM) 1003 according to the command. Alternatively, the CPU 1002 loads a program stored in the hard disk 1005 to a random access memory (RAM) 1004 and executes the program.

Accordingly, the CPU 1002 performs processing according to the above-described flowcharts or processing executed by components of the above-described block diagrams. In addition, the CPU 1002, for example, outputs a processing result from an output unit 1006 through the input/output interface 1010 or transmits the processing result from a communication unit 1008 and additionally records the processing result in the hard disk 1005, or the like as necessary.

Note that the input unit 1007 is configured as a keyboard, a mouse, a microphone, or the like. In addition, the output unit 1006 is configured as a liquid crystal display (LCD), a speaker, or the like.

Here, processing executed by a computer according to a program is not necessarily performed according to a sequence described as a flowchart in the present description. That is, processing executed by a computer according to a program also includes processing executed in parallel or individually (e.g., parallel processing or processing according to objects).

In addition, a program may be processed by a single computer (processor) or may be processed by a plurality of computers in a distributed manner. Further, a program may be transmitted to a distant computer and executed.

Further, in the present description, the system means a set of a plurality of components (devices, modules (parts), etc.), and it does not matter whether or not all the components are arranged in a single housing. Thus, a plurality of devices accommodated in separate housings and connected via a network, and one device in which a plurality of modules are accommodated in one housing are both systems.

Further, for example, the configuration described as one device (or one processing unit) may be divided to be configured as a plurality of devices (or processing units). In contrast, the configuration described as the plurality of devices (or processing units) may be collected and configured as one device (or processing unit). A configuration other than the above-described configuration may be added to the configuration of each device (or each processing unit). Further, when the configuration or the operation are substantially the same in the entire system, a part of the configuration of a certain device (or processing unit) may be included in the configuration of another device (or another processing unit).

Further, for example, the present technology may have a cloud computing configuration in which one function is shared with and processed by a plurality of devices via a network.

Further, for example, the program described above may be executed on any device. In this case, the device may have a necessary function (a functional block or the like) and may be able to obtain necessary information.

Further, for example, the respective steps described in the above-described flowchart may be executed by one device or in a shared manner by a plurality of devices. Furthermore, in a case where a plurality of steps of processing are included in one step, the plurality of steps of processing included in one step may be executed by one device or by a plurality of devices in a shared manner. In other words, a plurality of kinds of processing included in one step can also be executed as processing of a plurality of steps. In contrast, processing described as a plurality of steps can be collectively performed as one step.

For a program executed by a computer, processing of steps describing the program may be performed chronologically in order described in the present description or may be performed in parallel or individually at a necessary timing such as the time of calling. That is, processing of each step may be performed in order different from the above-described order as long as inconsistency does not occur. Further, processing of steps describing the program may be performed in parallel to processing of another program or may be performed in combination with processing of another program.

The present technology described as various modes in the present description may be implemented independently alone as long as no contradiction arises. Of course, any plurality of present technologies may be implemented together. For example, some or all of the present technologies described in several embodiments may be implemented in combination with some or all of the present technologies described in the other embodiments. A part or all of any above-described present technology can also be implemented together with another technology which has not be undescribed above.

<Combination Examples of Configurations>

The present technology can also be configured as follows.

(1) An image processing device including a decoding unit that decodes a bitstream to generate an image according to an encoding standard in which a horizontal size of one tile is restricted for each level by a restriction value.

(2) The image processing device according to (1), wherein the restriction value is set according to a maximum size of the image.

(3) The image processing device according to (1) or (2), wherein the restriction value is set according to the following equation (1) using a maximum value MaxLumaPs of the number of luminance picture samples.

[Math. 1]

$$\begin{cases} \text{Max\_tile\_width\_in\_luma\_samples} = \sqrt{MaxLumaPs \times 2} \\ \qquad = 0.5 \times \sqrt{MaxLumaPs \times 8} \\ \text{Max\_tile\_height\_in\_luma\_samples} = \sqrt{MaxLumaPs \times 2} \\ \qquad = 0.5 \times \sqrt{MaxLumaPs \times 8} \end{cases} \quad (1)$$

(4) The image processing device according to any one of (1) to (3), wherein a vertical size of one tile is restricted by the restriction value.

(5) The image processing device according to any one of (1) to (4), wherein the restriction value is applied for each tier defined by the encoding standard.

(6) An image processing method including allowing an image processing device to decode a bitstream to generate an image according to an encoding standard in which a horizontal size of one tile is restricted for each level by a restriction value.

(7) An image processing device including an encoding unit that encodes an image to generate a bitstream according to an encoding standard in which a horizontal size of one tile is restricted for each level by a restriction value.

(8) An image processing method including allowing an image processing device to encode an image to generate a bitstream according to an encoding standard in which a horizontal size of one tile is restricted for each level by a restriction value.

Note that embodiments of the present technology are not limited to the above-mentioned embodiments and can be modified in various manners without departing from the gist of the present disclosure. The effects described in the present description are merely illustrative and not restrictive, and other effects may be obtained.

REFERENCE SIGNS LIST

11 Image processing system
12 Image encoding device
13 Image decoding device
21 Prediction unit
22 Encoding unit
23 Line buffer
24 Column buffer
30 Prediction unit
31 Decoding unit
32 Line buffer
33 Column buffer

The invention claimed is:

1. An image processing device comprising:
processing circuitry configured to decode a bitstream to generate an image according to an encoding standard in which a horizontal size of one tile is restricted by a restriction value, wherein the restriction value is enabled by a flag in the bitstream,
wherein the restriction value is set according to each level that defines maximum resolution and frame rate and the following equation (1) using a maximum value MaxLumaPs of the number of luminance picture samples

[Math. 1]

$$\begin{cases} \text{Max\_tile\_width\_in\_luma\_samples} = \sqrt{MaxLumaPs \times 2} \\ \qquad = 0.5 \times \sqrt{MaxLumaPs \times 8} \end{cases} \quad (1)$$

2. The image processing device according to claim 1, wherein the restriction value is set according to a maximum size of the image.

3. An image processing method comprising:
allowing an image processing device to decode a bitstream to generate an image according to an encoding standard in which a horizontal size of one tile is restricted by a restriction value, wherein the restriction value is enabled by a flag in the bitstream,
wherein the restriction value is set according to each level that defines maximum resolution and frame rate and the following equation (1) using a maximum value MaxLumaPs of the number of luminance picture samples $$\begin{cases} \text{Max\_tile\_width\_in\_luma\_samples} = \sqrt{MaxLumaPs \times 2} \\ \qquad = 0.5 \times \sqrt{MaxLumaPs \times 8} \end{cases} \quad (1)$$

4. An image processing device comprising:
processing circuitry configured to encode an image to generate a bitstream according to an encoding standard in which a horizontal size of one tile is restricted by a restriction value, wherein the restriction value is enabled by a flag in the bitstream,
wherein the restriction value is set according to each level that defines maximum resolution and frame rate and the following equation (1) using a maximum value MaxLumaPs of the number of luminance picture samples $$\begin{cases} \text{Max\_tile\_width\_in\_luma\_samples} = \sqrt{MaxLumaPs \times 2} \\ \qquad = 0.5 \times \sqrt{MaxLumaPs \times 8} \end{cases} \quad (1)$$

5. An image processing method comprising:
allowing an image processing device to encode an image to generate a bitstream according to an encoding standard in which a horizontal size of one tile is restricted by a restriction value, wherein the restriction value is enabled by a flag in the bitstream,
wherein the restriction value is set according to each level that defines maximum resolution and frame rate and the following equation (1) using a maximum value MaxLumaPs of the number of luminance picture samples $$\begin{cases} \text{Max\_tile\_width\_in\_luma\_samples} = \sqrt{MaxLumaPs \times 2} \\ \qquad = 0.5 \times \sqrt{MaxLumaPs \times 8} \end{cases} \quad (1)$$

\* \* \* \* \*